US012711082B2

(12) United States Patent
Kikutani et al.

(10) Patent No.: US 12,711,082 B2
(45) Date of Patent: Aug. 18, 2026

(54) METHOD OF CONTROLLING DATA PROCESSING SYSTEM AND DATA PROCESSING SYSTEM

(71) Applicant: Socionext Inc., Kanagawa (JP)

(72) Inventors: Yuma Kikutani, Yokohama (JP); Yuki Soga, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 101 days.

(21) Appl. No.: 18/808,703

(22) Filed: Aug. 19, 2024

(65) Prior Publication Data

US 2024/0411712 A1 Dec. 12, 2024

Related U.S. Application Data

(63) Continuation of application No. PCT/JP2022/008202, filed on Feb. 28, 2022.

(51) Int. Cl.
*G06F 13/20* (2006.01)

(52) U.S. Cl.
CPC .......... *G06F 13/20* (2013.01); *G06F 2213/40* (2013.01)

(58) Field of Classification Search
CPC ............................ G06F 13/20; G06F 2213/40
See application file for complete search history.

(56) References Cited

U.S. PATENT DOCUMENTS 6,742,139 B1 * 5/2004 Forsman ............. G06F 11/0793 714/30
6,862,642 B1 * 3/2005 Packer ................ G06F 13/4045 710/312
7,860,940 B2 * 12/2010 Soga ................... G06F 11/0742 710/110
9,665,528 B2 * 5/2017 Freudenberger ...... G06F 13/404
10,579,581 B2 * 3/2020 Pitigoi-Aron ....... G06F 13/4291

(Continued)

FOREIGN PATENT DOCUMENTS

CN 112749057 A 5/2021
JP H5-265787 A 10/1993

(Continued)

OTHER PUBLICATIONS

International Search Report dated Apr. 26, 2022 issued in International Patent Application No. PCT/JP2022/008202, with English translation.

(Continued)

*Primary Examiner* — Henry Tsai
*Assistant Examiner* — Christopher A Daley
(74) *Attorney, Agent, or Firm* — Rimon P.C.

(57) ABSTRACT

A method of controlling a data processing system including a master, a slave, and a bus provided on a path connecting the master and the slave. The method of controlling the data processing system includes: performing normal processing and performing anomaly avoidance processing to avoid an anomalous state when the slave is anomalous. The performing of the anomaly avoidance processing includes: resetting the slave; and performing a first pseudo response which includes disconnecting communication between the bus and the slave, generating first pseudo response signals corresponding one to one to the plurality of command signals in place of the slave, and transmitting the first pseudo response signals to the master via the bus.

7 Claims, 13 Drawing Sheets

(56) References Cited

U.S. PATENT DOCUMENTS

| | | | | |
|---|---|---|---|---|
| 12,093,197 | B2 * | 9/2024 | Wang | G06F 13/4081 |
| 12,425,266 | B2 * | 9/2025 | Kobayashi | H04L 12/417 |
| 2005/0081115 | A1 * | 4/2005 | Cheng | G06F 11/0751<br>714/47.1 |
| 2010/0153602 | A1 * | 6/2010 | Kume | G06F 13/4226<br>710/110 |
| 2012/0151108 | A1 | 6/2012 | Soga | |
| 2013/0238825 | A1 * | 9/2013 | Hiraoka | G06F 13/4286<br>710/110 |
| 2015/0378851 | A1 * | 12/2015 | Kobayasi | G06F 11/0709<br>714/4.1 |
| 2018/0157553 | A1 * | 6/2018 | Ryu | G06F 13/4282 |

FOREIGN PATENT DOCUMENTS

| | | | |
|---|---|---|---|
| JP | 2001-237842 | A | 8/2001 |
| JP | 2003-060650 | A | 2/2003 |
| JP | 2006-148384 | A | 6/2006 |
| JP | 2011-223395 | A | 11/2011 |
| WO | 2011/043007 | A1 | 4/2011 |

OTHER PUBLICATIONS

Written Opinion of the International Searching Authority dated Apr. 26, 2022 issued in International Patent Application No. PCT/JP2022/008202, with English translation.

Notice of Reasons for Refusal issued in corresponding Japanese Patent Application No. 2024-502720, mailed on May 19, 2026.

* cited by examiner

Figure 1:
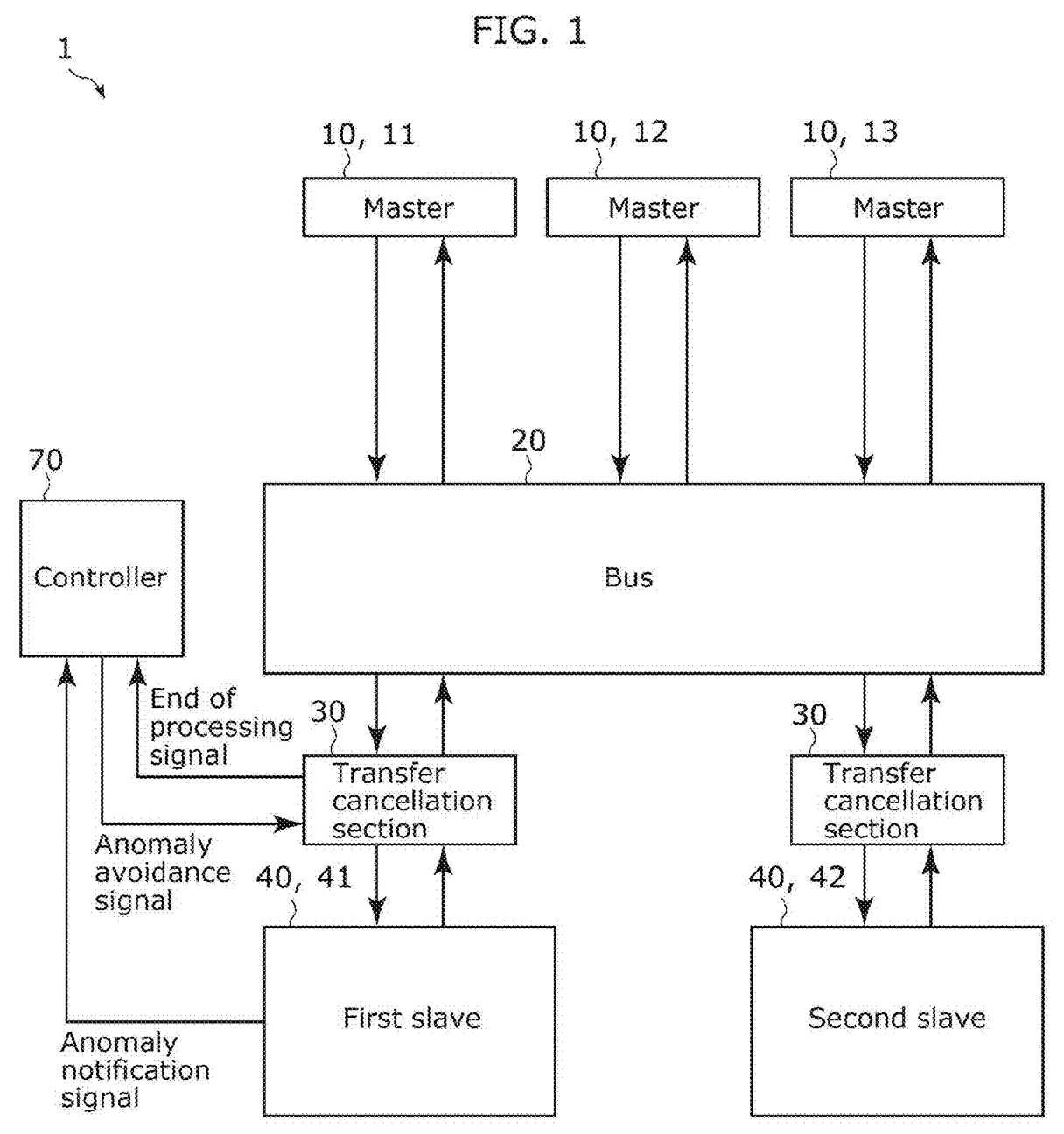

10, 11
Master 10, 12
Master 10, 13
Master

20
Bus

70
Controller

End of processing signal

30
Transfer cancellation section

30
Transfer cancellation section

Anomaly avoidance signal 40, 41
First slave 40, 42
Second slave

Anomaly notification signal 1
(a) Normal operation
10, 11
10, 12
10, 13
Master
Master
Master
20
Bus
30
First transfer cancellation section
30
First transfer cancellation section
40, 41
First slave
40, 42
Second slave
1
(b) Anomaly avoidance operation
10, 11
10, 12
10, 13
Master
Master
Master
q1
20
Bus
30
q1
First transfer cancellation section
30
First transfer cancellation section
40, 41
First slave
Reset process
40, 42
Second slave

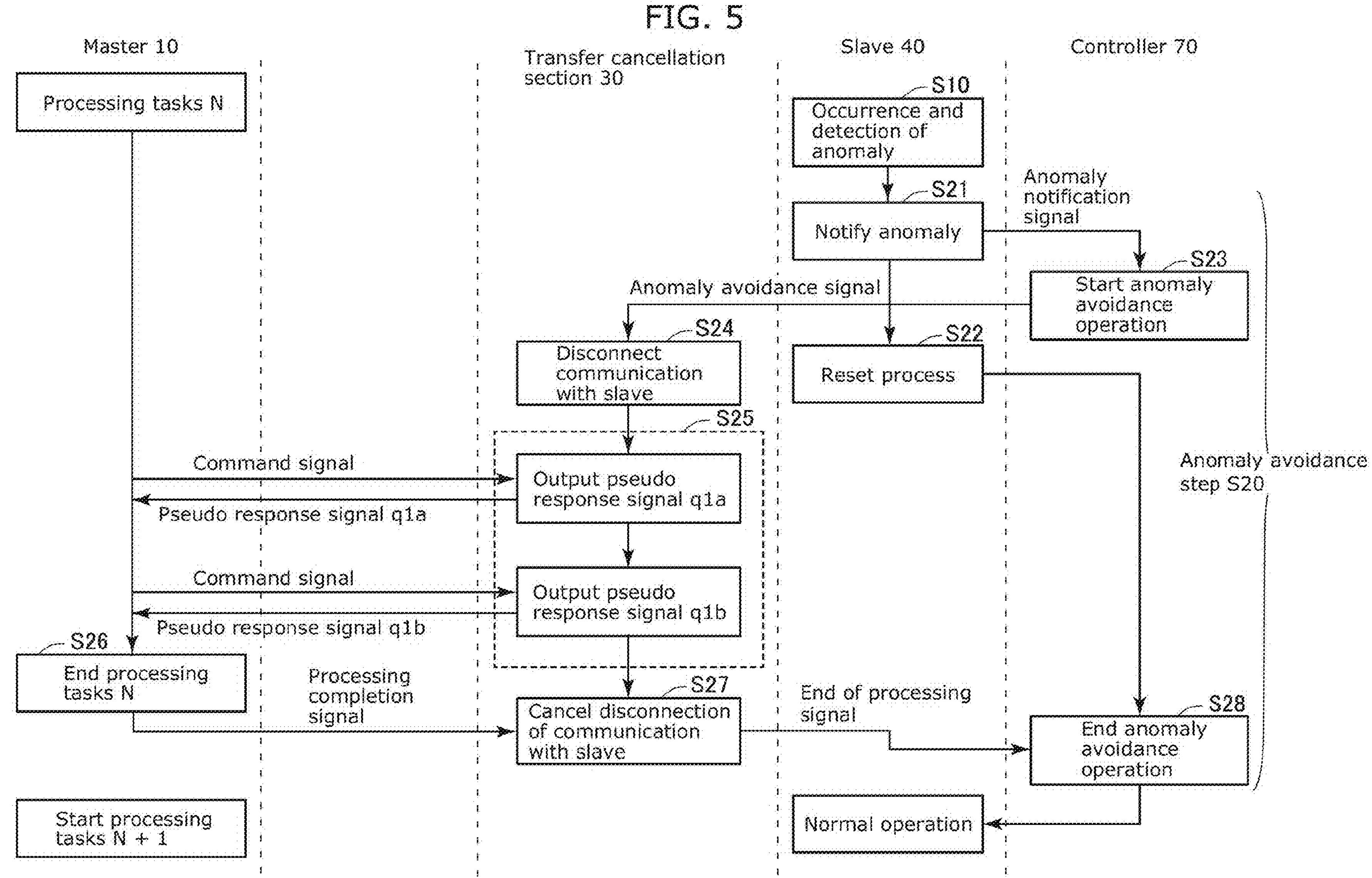
FIG. 5
Master 10
Transfer cancellation section 30
Slave 40
Controller 70
Processing tasks N
S10
Occurrence and detection of anomaly
S21
Notify anomaly
Anomaly notification signal
S23
Start anomaly avoidance operation
Anomaly avoidance signal
S24
Disconnect communication with slave
S22
Reset process
S25
Command signal
Output pseudo response signal q1a
Pseudo response signal q1a
Anomaly avoidance step S20
Command signal
Output pseudo response signal q1b
Pseudo response signal q1b
S26
End processing tasks N
Processing completion signal
S27
Cancel disconnection of communication with slave
End of processing signal
S28
End anomaly avoidance operation
Start processing tasks N + 1
Normal operation

FIG. 6

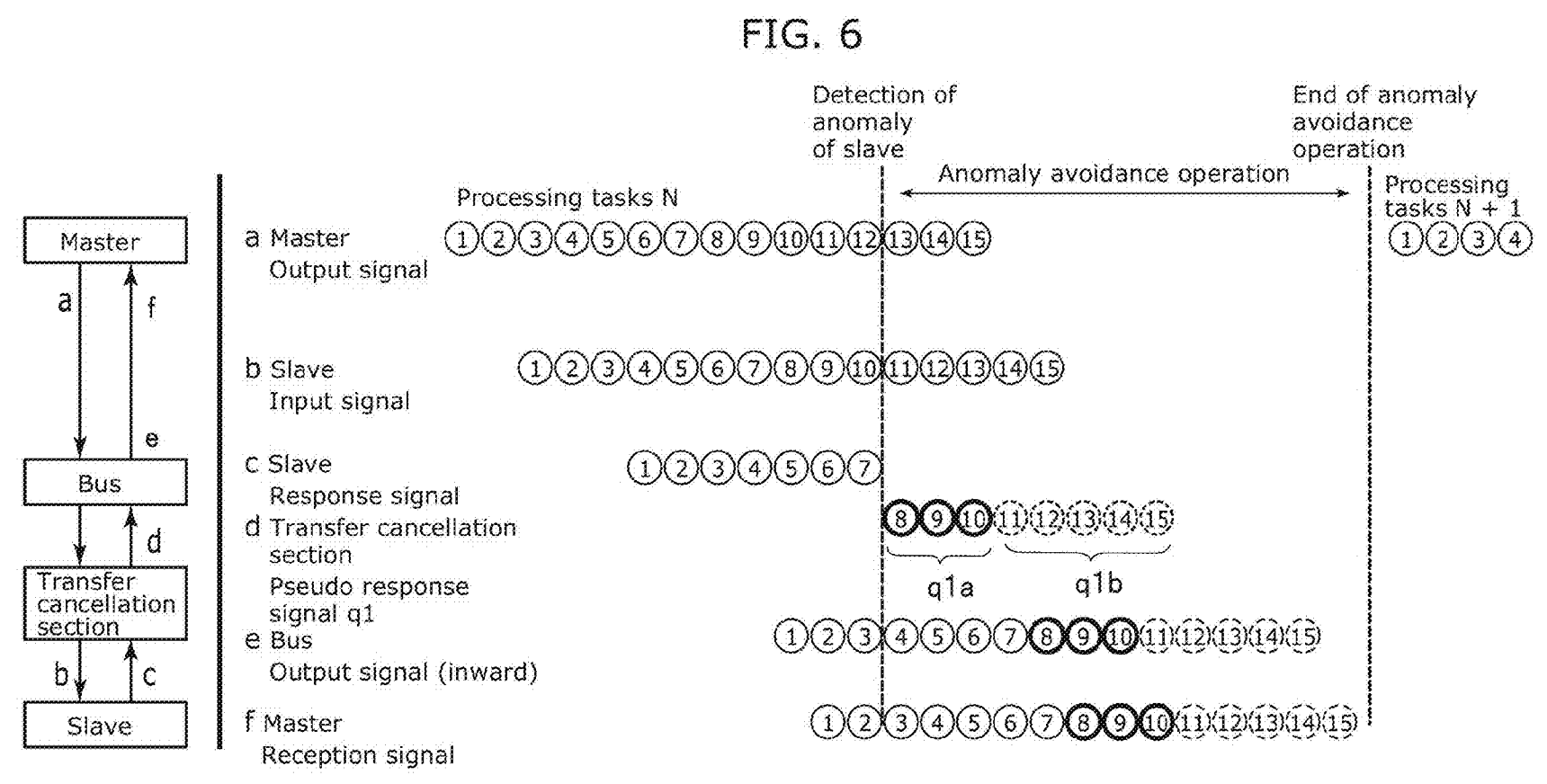

Master
Bus
Transfer cancellation section
Slave
a
b
c
d
e
f

Detection of anomaly of slave
Anomaly avoidance operation
End of anomaly avoidance operation
Processing tasks N
Processing tasks N + 1 a Master Output signal
b Slave Input signal
c Slave Response signal
d Transfer cancellation section Pseudo response signal q1
e Bus Output signal (inward)
f Master Reception signal
q1a
q1b

Figure 10:
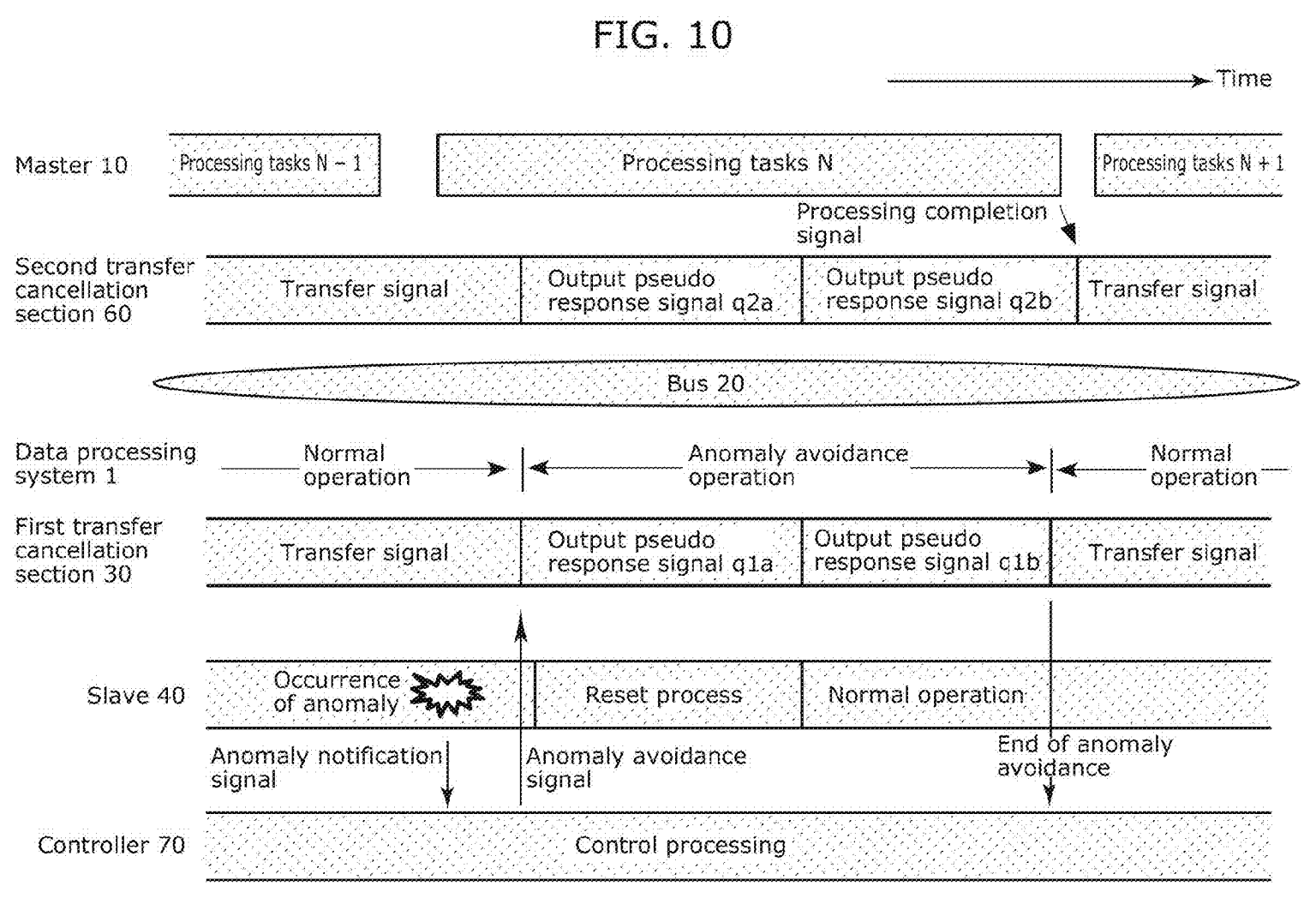

Time

Master 10
Processing tasks N − 1
Processing tasks N
Processing tasks N + 1
Processing completion signal Second transfer cancellation section 60
Transfer signal
Output pseudo response signal q2a
Output pseudo response signal q2b
Transfer signal Bus 20

Data processing system 1
Normal operation
Anomaly avoidance operation
Normal operation First transfer cancellation section 30
Transfer signal
Output pseudo response signal q1a
Output pseudo response signal c1b
Transfer signal Slave 40
Occurrence of anomaly
Reset process
Normal operation Anomaly notification signal
Anomaly avoidance signal
End of anomaly avoidance Controller 70
Control processing

FIG. 13

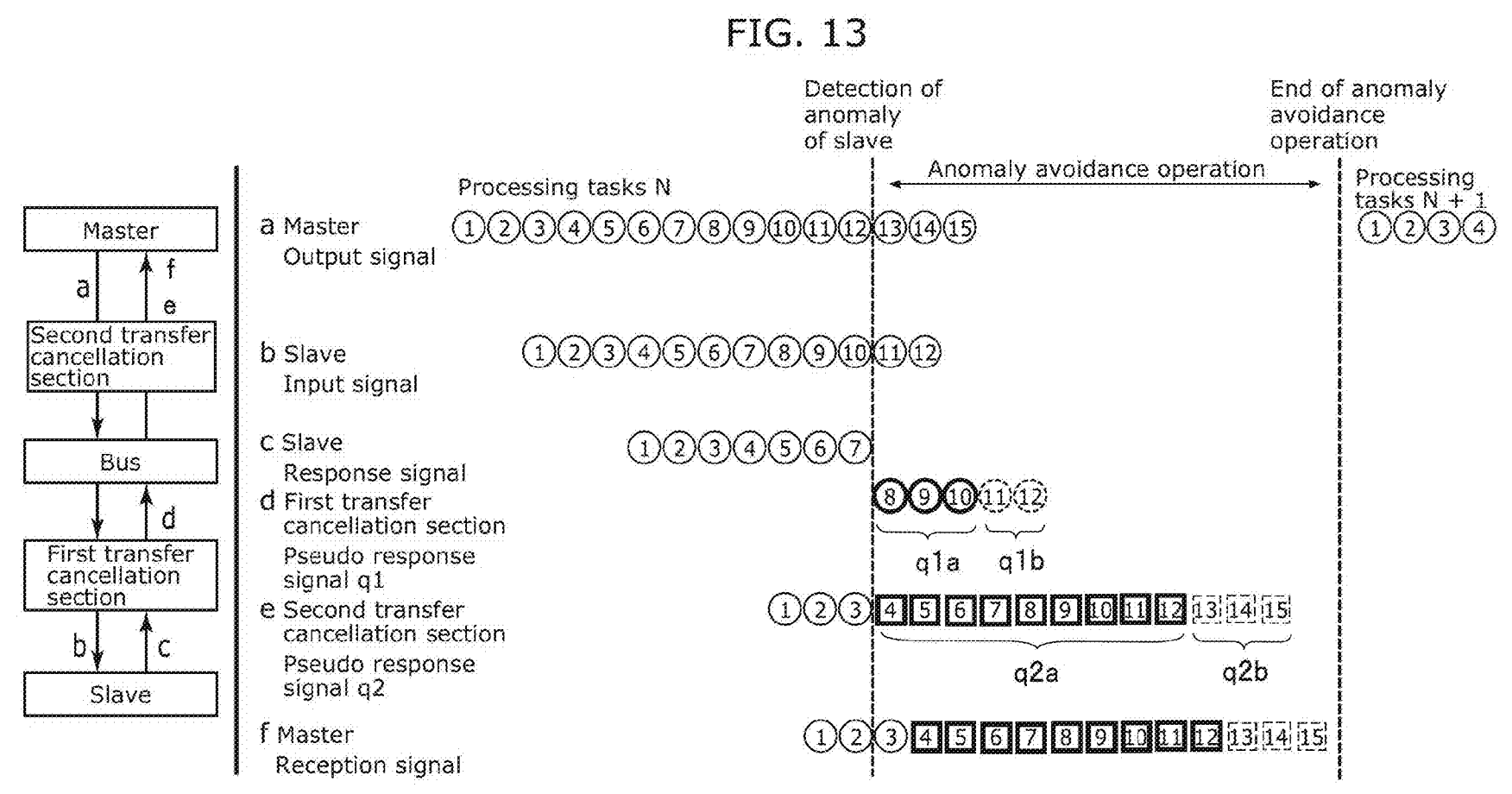

Master
Second transfer cancellation section
Bus
First transfer cancellation section
Slave
a
b
c
d
e
f a Master Output signal
b Slave Input signal
c Slave Response signal
d First transfer cancellation section Pseudo response signal q1
e Second transfer cancellation section Pseudo response signal q2
f Master Reception signal Processing tasks N
Detection of anomaly of slave
Anomaly avoidance operation
End of anomaly avoidance operation
Processing tasks N + 1
q1a
q1b
q2a
q2b

METHOD OF CONTROLLING DATA PROCESSING SYSTEM AND DATA PROCESSING SYSTEM

CROSS REFERENCE TO RELATED APPLICATION

This is a continuation application of PCT Patent Application No. PCT/JP2022/008202 filed on Feb. 28, 2022, designating the United States of America. The entire disclosure of the above-identified application, including the specification, drawings and claims is incorporated herein by reference in its entirety.

FIELD

The present disclosure relates to a data processing system which includes a master and a slave, and a method of controlling the data processing system.

BACKGROUND

Data processing systems in which data is processed by a master and a slave are conventionally known. Patent Literature (PTL) 1 discloses a data processing system in which, when an anomaly has occurred in a master, the anomaly is resolved by resetting only the master.

CITATION LIST

Patent Literature

PTL 1: International Publication No. 2011/043007

SUMMARY

Technical Problem

With the data processing system disclosed by PTL 1, when an anomaly has occurred in the master, it is possible to address the anomaly, but when an anomaly has occurred in the slave, it is difficult to properly handle the state in which an anomaly has occurred in the slave.

The present disclosure provides a method of controlling a data processing system, etc. that are capable of properly handling the state in which an anomaly has occurred in the slave.

Solution to Problem

A method of controlling a data processing system according to one aspect of the present disclosure is a method of controlling a data processing system including a master, a slave, and a bus provided on a path connecting the master and the slave. The method of controlling the data processing system includes: performing normal processing which includes transmitting a plurality of command signals from the master to the slave via the bus and transmitting a plurality of response signals for the plurality of command signals from the slave to the master via the bus; and performing anomaly avoidance processing to avoid an anomalous state when the slave is anomalous. In the method of controlling the data processing system, the performing of the anomaly avoidance processing includes: resetting the slave; and performing a first pseudo response which includes disconnecting communication between the bus and the slave, generating first pseudo response signals corresponding one to one to the plurality of command signals in place of the slave, and transmitting the first pseudo response signals to the master via the bus.

A method of controlling a data processing system according to another aspect of the present disclosure is a method of controlling a data processing system including a master, a slave, and a bus provided on a path connecting the master and the slave. The method of controlling the data processing system includes: performing normal processing which includes transmitting a plurality of command signals from the master to the slave via the bus and transmitting a plurality of response signals for the plurality of command signals from the slave to the master via the bus; and performing anomaly avoidance processing to avoid an anomalous state when the slave is anomalous. In the method of controlling the data processing system, the performing of the anomaly avoidance processing includes: resetting the slave; performing a first pseudo response which includes disconnecting communication between the bus and the slave, generating first pseudo response signals corresponding one to one to the plurality of command signals in place of the slave, and transmitting the first pseudo response signals toward the master via the bus; and performing a second pseudo response which includes generating second pseudo response signals corresponding to the first pseudo response signals and corresponding to the plurality of command signals transmitted from the master after the disconnecting of the communication between the bus and the slave, and transmitting the second pseudo response signals to the master.

A data processing system according to one aspect of the present disclosure is a data processing system including: a master; a slave; a bus provided on a path connecting the master and the slave; and a first transfer cancellation section provided on a path connecting the bus and the slave. In the data processing system, the master transmits a plurality of command signals to the slave via the bus and the first transfer cancellation section, the slave transmits a plurality of response signals for the plurality of command signals to the master via the first transfer cancellation section and the bus, and when the slave is anomalous: the slave performs a reset process; and the first transfer cancellation section disconnects communication with the slave, generates first pseudo response signals corresponding one to one to the plurality of command signals in place of the slave, and transmits the first pseudo response signals to the master via the bus.

A data processing system according to another aspect of the present disclosure is a data processing system including: a master; a slave; a bus provided on a path connecting the master and the slave; a first transfer cancellation section provided on a path connecting the bus and the slave; and a second transfer cancellation section provided on a path connecting the master and the bus. In the data processing system, the master transmits a plurality of command signals to the slave via the second transfer cancellation section, the bus, and the first transfer cancellation section, the slave transmits a plurality of response signals for the plurality of command signals to the master via the first transfer cancellation section, the bus, and the second transfer cancellation section, and when the slave is anomalous: the slave performs a reset process; the first transfer cancellation section disconnects communication with the slave, generates first pseudo response signals corresponding one to one to the plurality of command signals in place of the slave, and transmits the first pseudo response signals to the second transfer cancellation section via the bus; and the second transfer cancellation section generates second pseudo response signals corresponding to the first pseudo response signals and corresponding to the plurality of command signals transmitted from the master after the communication with the slave has been disconnected, and transmits the second pseudo response signals to the master.

It should be noted that these generic and specific aspects may be implemented using a system, a device, an integrated circuit, a computer program, or a computer-readable recording medium such as a compact disc-read only memory (CD-ROM), and may also be implemented by any combination of systems, devices, integrated circuits, computer programs, and recording media.

Advantageous Effects

With the method of controlling the data processing system, etc. according to the present disclosure, it is possible to properly handle the state in which an anomaly has occurred in the slave.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 1 is a block configuration diagram of a data processing system according to Embodiment 1.

FIG. 5 is a diagram illustrating a method of controlling the data processing system according to Embodiment 1.

FIG. 6 is a diagram illustrating a signal that passes between the blocks of the data processing system according to Embodiment 1.

FIG. 7 is a block configuration diagram of a data processing system according to Embodiment 2.

FIG. 10 is a diagram illustrating in chronological order the anomaly avoidance operation of the data processing system according to Embodiment 2.

FIG. 13 is a diagram illustrating a signal that passes between the blocks of the data processing system according to Embodiment 2.

Figure 2:
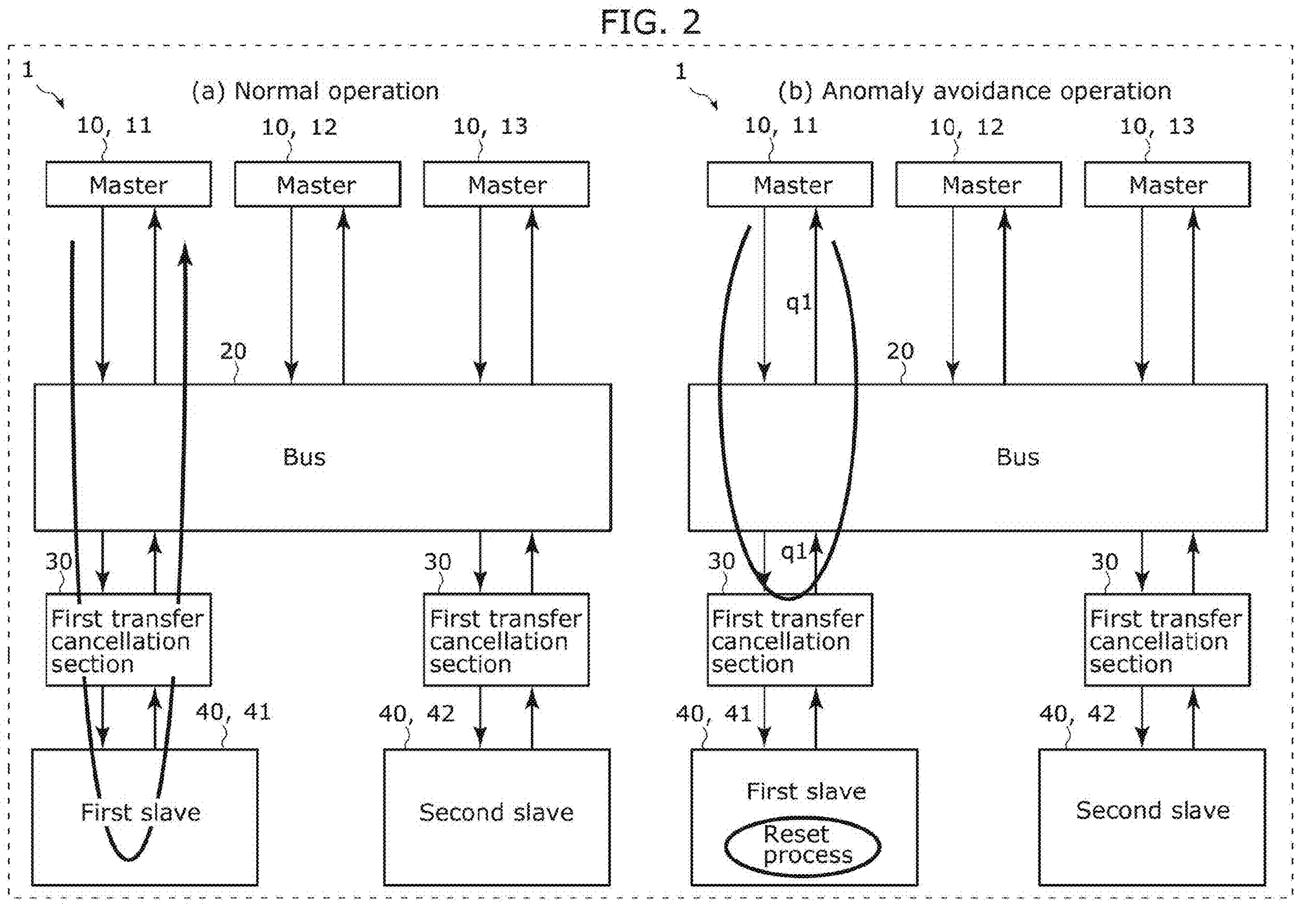
FIG. 2 is a diagram schematically illustrating an operation of the data processing system according to Embodiment 1.

DESCRIPTION OF EMBODIMENTS (Circumstances Leading to the Present Disclosure)

As a conventional technique, data processing systems are known in which data is processed by a master and a slave. In recent years, data processing has become more and more advanced and diverse. Such processing is implemented by improving processing performance as a result of many processing blocks included in a large-scale integration (LSI) with increased integration operating in parallel and in conjunction with each other.

For example, when a certain portion of an LSI fails to operate normally for some reason during the operation of the LSI, it is possible to reset the entire LSI to its normal state if it is acceptable that the time during which the LSI cannot operate normally lasts long. However, if it is problematic that the time during which the LSI cannot operate normally lasts long, the LSI need to return to its normal state quickly.

In view of the above, instead of resetting the entire LSI, it is conceivable to cause the LSI to quickly return to its normal state by resetting only the portion of the LSI that fails to operate normally. The data processing system according to the present disclosure is configured such that, when an anomaly has occurred in a slave, for example, it is possible to cause the system to quickly return to the normal state, by resetting only the slave.

Hereinafter, embodiments will be described in detail with reference to the Drawings. It should be noted that each of the exemplary embodiments described below shows one specific example of the present disclosure. The numerical values, shapes, materials, structural components, the arrangement and connection of the structural components, steps, the processing order of the steps etc. described in the following embodiments are mere examples, and therefore do not limit the scope of the present disclosure. In addition, among the structural components in the following embodiments, structural components not recited in any one of the independent claims each indicating the embodiment according to one aspect of the present disclosure are described as arbitrary structural elements. The embodiments of the present disclosure are not limited to the currently presented independent claims, but may also be represented by other independent claims.

In addition, each of the diagrams is a schematic diagram and not necessarily strictly illustrated. In each of the diagrams, substantially the same structural components are assigned with the same reference signs, and there are instances where redundant descriptions are omitted or simplified.

Embodiment 1

[Schematic Configuration of Data Processing System]

A schematic configuration of the data processing system according to Embodiment 1 will be described with reference to FIG. 1 and FIG. 2.

FIG. 1 is a block configuration diagram of data processing system 1 according to Embodiment 1. FIG. 2 is a diagram schematically illustrating an operation of data processing system 1. In (a) of FIG. 2, the operation of data processing system 1 during a normal operation is illustrated, and in (b) of FIG. 2, the operation of data processing system 1 during an anomaly avoidance operation.

As illustrated in FIG. 1, data processing system 1 includes a plurality of masters 10, a plurality of slaves 40, bus 20 located on a path connecting the plurality of masters 10 and the plurality of slaves 40, and a plurality of transfer cancellation sections 30 located on the respective paths connecting bus 20 and the plurality of slaves 40.

As illustrated in (a) of FIG. 2, when data processing system 1 is normal, master 10 transmits a plurality of command signals and data signals to slave 40 via bus 20 and transfer cancellation section 30. In addition, slave 40 transmits a plurality of response signals for the plurality of command signals to master 10 via transfer cancellation section 30 and bus 20.

As illustrated in (b) of FIG. 2, when first slave 41 among the plurality of slaves 40 becomes anomalous, data processing system 1 performs an anomaly avoidance operation. For example, first slave 41 performs a reset process, and transfer cancellation section 30 disconnects the communication with first slave 41. Then, transfer cancellation section 30 generates pseudo response signals q1 corresponding one to one to the plurality of command signals in place of first slave 41, and transmits pseudo response signals q1 to master 10 via bus 20.

Each of pseudo response signals q1 is a dummy signal transmitted to master 10 during the reset process of first slave 41. Master 10 cannot proceed to the next processing unless master 10 receives a response to the command issued. Thus, according to the present embodiment, transfer cancellation section 30 transmits pseudo response signal q1 to master 10 in place of first slave 41.

As described above, by transmitting pseudo response signal q1 to master 10 during the reset process of first slave 41, it is possible to cause the system to return to the normal state without stopping the next processing of master 10. Since pseudo response signal q1 is a dummy signal, the result of the processing by master 10 using pseudo response signal q1 lacks precision. However, in the case where data processing is video processing, for example, the frame rate of video is approximately 60 frames per second, and thus even if the processing of one frame is not precise, it is considered that there should be no major problem in viewing video as long as the processing before and after the frame is precise.

In data processing system 1 according to the present embodiment, it is possible to cause the system to quickly return to the normal state, by resetting only first slave 41 while inhibiting quality degradation caused by the reset process of first slave 41. In this manner, it is possible to properly handle the state in which an anomaly has occurred in first slave 41.

[Detailed Configuration of Data Processing System]

The detailed configuration of data processing system 1 will be described with reference to FIG. 1 to FIG. 4.

Data processing system 1, for example, is configured by a large-scale integration (LSI).

As illustrated in FIG. 1, data processing system 1 includes a plurality of masters 10, bus 20, a plurality of transfer cancellation sections 30, and a plurality of slaves 40. In addition, data processing system 1 includes controller 70. Masters 10 and slaves 40 are connected via bus 20 and transfer cancellation sections 30.

Masters 11, 12, and 13 constitute the plurality of masters 10. In the following description, one or more of masters 11 to 13 may be referred to as master 10. It should be noted that a total number of masters 10 is not limited to three, but may be one or two or four or more. Master 10 is, for example, a microprocessor, a digital signal processor (DSP), a direct memory access (DMA) controller, etc.

First slave 41 and second slave 42 constitute the plurality of masters 40. In the following description, one or more of slaves 41 and 42 may be referred to as slave 40. It should be noted that a total number of slaves 40 is not limited to two, but may be one or three or more. slave 40 is, for example, a peripheral Input/Output (I/O) controller, or the like.

Slave 40 has an anomaly detection function to detect whether slave 40 itself is normal or anomalous. When slave 40 is anomalous, slave 40 is capable of outputting a status signal to controller 70 as well as resetting slave 40 itself. It should be noted that slave 40 need not necessarily have the anomaly detection function. Slave 40 may be monitored for an anomaly, based on a monitoring signal from outside. In addition, slave 40 may be reset as a result of receiving a reset signal output from controller 70.

Bus 20 is located on the path connecting master 10 and slave 40. Bus 20 transmits an output signal output from master 10 to slave 40, and transmits a response signal transmitted as a reply from slave 40 to master 10. The output signals output from master 10 are, for example, a command signal and a data signal issued to slave 40. The command signal includes control information for controlling the operation of slave 40. The data signal includes write data information for writing data to slave 40. The response signal transmitted as a reply from slave 40 includes read data information that is read based on the command signal.

Transfer cancellation section 30 is located on the path connecting bus 20 and slave 40. Transfer cancellation section 30 may include, for example, a microprocessor, a digital signal processor (DSP), a direct memory access (DMA) controller, or the like, or may be controlled externally by them. In addition, a sequence for anomaly avoidance may be installed in advance. The functions of each of the blocks in transfer cancellation section 30, i.e., transfer cancellation controller 31, bus disconnection section 32, data generation section 33, and data absorption section 34, are implemented by control from outside or control within transfer cancellation section 30 (see FIG. 3).

In a normal state in which no anomaly has occurred, transfer cancellation section 30 transfers a plurality of command signals and a plurality of data signals transmitted from master 10 via bus 20 to slave 40 as they are, and transfers the data signals transmitted back from slave 40 to master 10 via bus 20 as they are.

Figure 3:
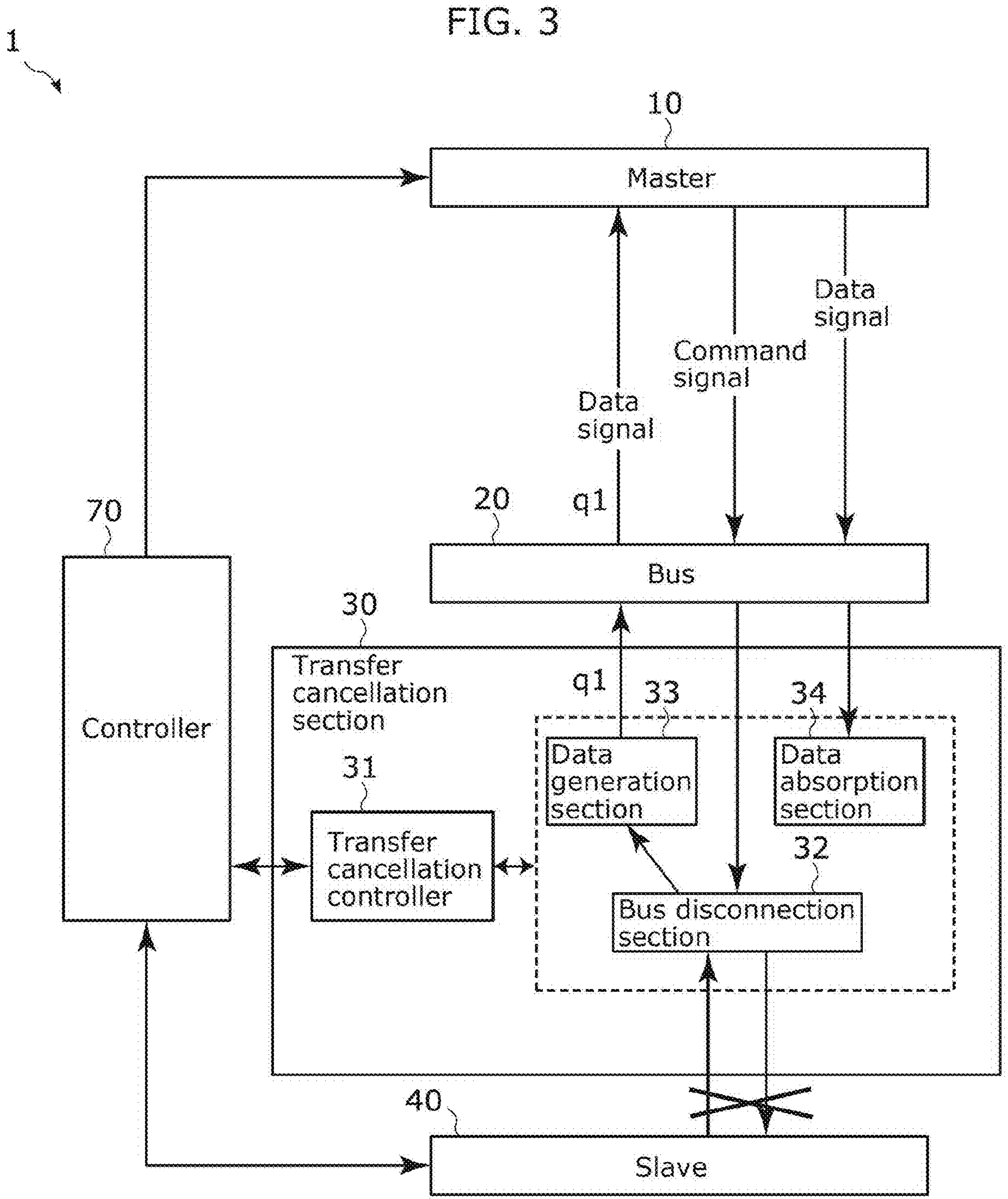
FIG. 3 is a diagram illustrating an anomaly avoidance operation of the data processing system according to Embodiment 1.

FIG. 3 is a diagram illustrating an anomaly avoidance operation of data processing system 1. It should be noted that, in FIG. 3, the direction of signal output from each block is indicated by arrows.

Controller 70 controls the anomaly avoidance operation of data processing system 1. Controller 70 is, for example, a microprocessor, a DSP, a DMA controller, or the like. Controller 70 is wire-connected to each of master 10, slave 40, and transfer cancellation section 30.

For example, when an anomaly has occurred in slave 40, slave 40 transmits an anomaly notification signal to controller 70, and then resets slave 40 itself. Upon receiving the anomaly notification signal transmitted from slave 40, controller 70 transmits an anomaly avoidance signal indicating the start of an anomaly avoidance operation to transfer cancellation section 30. Transfer cancellation section 30 that has received the anomaly avoidance signal performs a predetermined anomaly avoidance operation.

As illustrated in FIG. 3, transfer cancellation section 30 includes transfer cancellation controller 31, bus disconnection section 32, data generation section 33, and data absorption section 34.

Transfer cancellation controller 31 controls the start of the operations of bus disconnection section 32, data generation section 33, and data absorption section 34, based on the control signal output from controller 70. In addition, transfer cancellation controller 31 notifies controller 70 of the operation statuses of bus disconnection section 32, data generation section 33, and data absorption section 34, as well as the end of the operation of transfer cancellation section 30.

Data absorption section 34 absorbs the data signal output from master 10 during the anomaly avoidance operation. In other words, data absorption section 34 absorbs and discards the data signal in order to prevent the write data information output from master 10 from reaching slave 40.

Bus disconnection section 32 disconnects the communication with slave 40 during the anomaly avoidance operation. For example, bus disconnection section 32, during the period from the start to the end of the anomaly avoidance operation, stops transmitting the command signals and data signals transmitted from master 10 to slave 40, and stops receiving the signals output from slave 40.

In addition, bus disconnection section 32 has a storage function (storage) that stores history information related to the transmission and reception of a command signal and a response signal. Bus disconnection section 32 is, using the history information, capable of determining whether the command signal transmitted from master 10 has been transmitted from bus disconnection section 32 to slave 40. In addition, bus disconnection section 32 is capable of determining whether or not slave 40 has transmitted a response signal for the command signal transmitted to slave 40.

Data generation section 33 generates pseudo response signal q1 to be transmitted to master 10 during the anomaly avoidance operation. Pseudo response signal q1 is a dummy signal that is transmitted to master 10 in place of a response signal transmitted by slave 40 during the reset process of slave 40. The signal format of pseudo response signal q1 is the same as the signal format of the response signal transmitted from slave 40 to master 10 via bus 20 during the normal operation. The same signal format means, for example, that the storage format for storing data, a total number of storages of data, or the compression format for compressing data is the same.

In this manner, data generation section 33 generates a plurality of pseudo response signals q1 corresponding one to one to a plurality of command signals received from master 10 via bus 20. Data generation section 33 transmits the plurality of pseudo response signals q1 to master 10 via bus 20.

Figure 4:
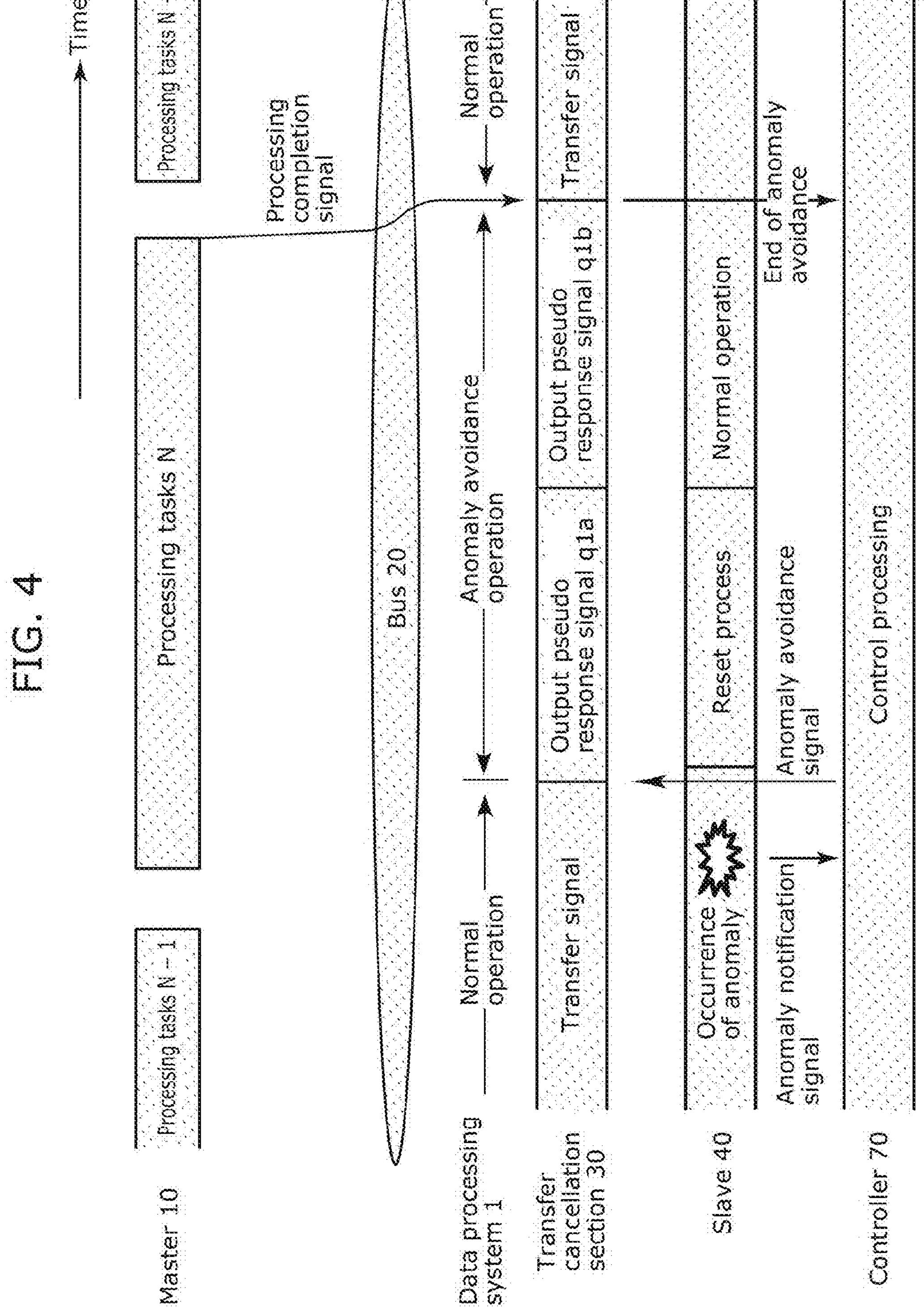
FIG. 4 is a diagram illustrating in chronological order the anomaly avoidance operation of the data processing system according to Embodiment 1.

FIG. 4 is a diagram illustrating in chronological order the anomaly avoidance operation of data processing system 1.

As illustrated in FIG. 4, when an anomaly has occurred in slave 40, slave 40 transmits an anomaly notification signal to controller 70. Controller 70 outputs an anomaly avoidance signal to transfer cancellation section 30. Transfer cancellation section 30 performs an anomaly avoidance operation based on a control signal from controller 70.

Transfer cancellation section 30, in place of slave 40, generates pseudo response signals q1 corresponding one to one to the plurality of command signals. Pseudo response signals q1 are divided into two subsets, namely, a first subset including pseudo response signal q1*a* and a second subset including pseudo response signal q1*b*, depending on whether a command signal has been transmitted from transfer cancellation section 30 to slave 40. Pseudo response signal q1*a* is a signal corresponding to a command signal which has been transmitted from transfer cancellation section 30 to slave 40, and pseudo response signal q1*b* is a signal corresponding to a command signal which has not been transmitted from transfer cancellation section 30 to slave 40. The time when an anomaly of slave 40 is detected is the boundary that divides whether a command signal has been transmit to slave 40 or not.

More specifically, transfer cancellation section 30 causes data generation section 33 to generate, as pseudo response signal q1*a*, a signal corresponding to a command signal which has been transmitted to slave 40 but for which no response signal has been transmitted from slave 40 among the plurality of command signals. Data generation section 33 generates pseudo response signal q1*a* based on the instruction from bus disconnection section 32, and transmits pseudo response signal q1*a* to master 10 via bus 20. In addition, transfer cancellation section 30 causes data generation section 33 to generate, as pseudo response signal q1*b*, a signal corresponding to a command signal which has not been transmitted to slave 40. Data generation section 33 generates pseudo response signal q1*b* based on the instruction from bus disconnection section 32, and transmits pseudo response signal q1*b* to master 10 via bus 20. The timing of transmission to master 10 is always later for pseudo response signal q1*b* than for pseudo response signal q1*a*. It should be noted that pseudo response signal q1*a* and pseudo response signal q1*b* are same in signal format.

After ending the generation of all pseudo response signals q1 corresponding to the plurality of command signals and transmitting the all pseudo response signals q1 to master 10, transfer cancellation section 30 notifies controller 70 of an end of processing signal for pseudo response signals q1.

Meanwhile, master 10 continues performing of processing tasks (N) of the processing details that master 10 was processing when slave 40 became anomalous, even when the anomaly avoidance operations described above are being performed. Master 10 outputs, to transfer cancellation section 30 via bus 20, a processing completion signal indicating that all of processing tasks (N) related to the above-described processing details have been completed. It should be noted that master 10 may transmit the processing completion signal to transfer cancellation section 30 through a path other than bus 20. For example, a dedicated signal line for notifying that the processing tasks have all been completed in master 10 may be provided between master 10 and transfer cancellation section 30.

The anomaly avoidance operation of data processing system 1 ends after: the reset process of slave 40 has ended; all pseudo response signals q1 corresponding to a plurality of command signals have been transmitted by transfer cancellation section 30; and master 10 have completed all of the processing tasks related to the above-described processing details. When these conditions are met, data processing system 1 returns to the normal state, and master 10 performs the next processing tasks (N+1).

In data processing system 1, when slave 40 is anomalous, slave 40 performs the reset process. Transfer cancellation section 30 disconnects the communication with slave 40, generates pseudo response signals q1 corresponding one to one to a plurality of command signals in place of slave 40, and transmits pseudo response signals q1 to master 10 via bus 20.

In this manner, by transmitting pseudo response signals q1 to master 10 during the reset process of slave 40, it is possible to cause the system to quickly return to the normal state by the reset process of slave 40 only, without stopping the next processing tasks of master 10. As a result, it is possible to properly handle the state in which an anomaly has occurred in slave 40. In addition, it is possible to simply implement the configuration for handling the state in which an anomaly has occurred in slave 40 without having to change the design or modify the functions of slave 40.

[Method of Controlling Data Processing System]

A method of controlling data processing system 1 according to Embodiment 1 will be described with reference to FIG. 5 and FIG. 6.

FIG. 5 is a diagram illustrating a method of controlling data processing system 1 according to Embodiment 1.

In data processing system 1 in the normal state (normal step), a plurality of command signals are transmitted from master 10 to slave 40 via bus 20. In addition, a plurality of response signals for the plurality of command signals are transmitted from slave 40 to master 10 via bus 20.

When an anomaly has occurred in slave 40 and the anomaly is detected (step S10), anomaly avoidance step S20 is performed in data processing system 1.

It should be noted that anomaly avoidance step S20 is performed on only slave 40 in which an anomaly has occurred, among the plurality of slaves 40, and the normal step continues to be performed on the other slaves 40 in which no anomaly has occurred. For example, when the anomaly avoidance steps is being performed on first slave 41, master 10 may transmit an other command signal different from the plurality of command signals to second slave (an other slave) 42 via bus 20, and second slave 42 may transmit a response signal for the other command signal via bus 20.

Hereafter, anomaly avoidance step S20 will be described in sequence. First, slave 40 in which an anomaly has occurred transmits an anomaly notification signal to controller 70 (step S21). In addition, slave 40 starts a reset process of slave 40 itself (reset step S22).

After receiving the anomaly notification signal, controller 70 outputs an anomaly avoidance signal to transfer cancellation section 30 (step S23). Transfer cancellation section 30 performs an anomaly avoidance operation based on a control signal from controller 70.

More specifically, transfer cancellation section 30 disconnects the communication with slave 40 (step S24). Transfer cancellation section 30 then generates pseudo response signals q1 corresponding one to one to a plurality of command signals in place of slave 40, and transmits pseudo response signals q1 to master 10 via bus 20 (pseudo response step S25). This pseudo response step S25 is started substantially concurrently with reset step S22. It should be noted that pseudo response step S25 may be performed before the start of reset step S22, concurrently with the start of reset step S22, or after the start of reset step S22.

In pseudo response step S25, pseudo response signal q1*a* is generated. Pseudo response signal q1*a* is a signal corresponding to the command signal that has been transmitted to slave 40 among the plurality of command signals. In addition, in pseudo response step S25, pseudo response signal q1*b* is generated. Pseudo response signal q1*b* is a signal corresponding to the command signal that has not been transmitted to slave 40 among the plurality of command signals. Pseudo response signal q1*a* and pseudo response signal q1*b* are transmitted to master 10 in the same order as the command signals issued by master 10.

FIG. 6 is a diagram illustrating a signal that passes between the blocks of data processing system 1.

In FIG. 6, the sequential order of the command signals issued by master 10 is indicated by the numerical sequence. As illustrated in this diagram, there is a time lag in the signals that pass between the blocks. In this diagram, signals generated during the normal operation are indicated by circled numbers, and pseudo response signals q1 generated during the anomaly avoidance operation are indicated by bold circled numbers and dashed circled numbers.

It is illustrated in this example that the command signals numbered 1 through 15 have been issued in processing tasks (N) of master 10 and that an anomaly has been detected between the issuance of the command signal numbered 12 and the issuance of the command signal numbered 13.

The command signals numbered 1 through 12 are signals issued during the normal operation. The command signals numbered 1 through 10 of them are transferred as they are from transfer cancellation section 30 to slave 40, and are input to slave 40. Slave 40 generates response signals corresponding to the command signals numbered 1 through 7 received before the detection of the anomaly, and transmits the response signals to transfer cancellation section 30. On the other hand, for the command signals numbered 8 through 15 received after the detection of the anomaly, response signals are not generated by slave 40 or the command signals do not reach slave 40 because the reset process is performed in slave 40. Accordingly, transfer cancellation section 30 generates pseudo response signals q1 for the command signals numbered 8 through 15.

More specifically, pseudo response signal q1*a* is generated for each of the command signals numbered 8 through 10 which have been transmitted from transfer cancellation section 30 to slave 40, but for which no response signal has been transmitted from slave 40. In addition, pseudo response signal q1*b* is generated for each of the command signals numbered 11 through 15 which have not been transmitted from transfer cancellation section 30 to slave 40.

The normal response signals numbered 1 through 7 generated by slave 40 and pseudo response signals q1 numbered 8 through 15 generated by transfer cancellation section 30 are transmitted to master 10 via bus 20.

As illustrated in FIG. 5, master 10 outputs a processing completion signal indicating that all of processing tasks N related to the processing details that master 10 was processing when slave 40 became anomalous have been completed, to transfer cancellation section 30 via bus 20 (step S26).

After: the reset process of slave 40 is completed; all of pseudo response signals q1 for a plurality of command signals are transmitted in pseudo response step S25; and the processing completion signal from master 10 is received, transfer cancellation section 30 cancels the disconnection of communication with slave 40 (step S27), and ends pseudo response step S25. Transfer cancellation section 30 notifies controller 70 of the end of processing signal. When receiving the end of processing signal, controller 70 ends the anomaly avoidance operation (step S28) and ends anomaly avoidance step S20. When these conditions are met, data processing system 1 returns to the normal state, and master 10 performs the next processing tasks (N+1).

The control method of data processing system 1 according to the present embodiment includes anomaly avoidance step S20 to avoid an anomalous state when slave 40 is anomalous. Anomaly avoidance step S20 includes: reset step S22 to reset slave 40; and pseudo response step S25 to disconnect the communication between bus 20 and slave 40, to generate pseudo response signals q1 corresponding one to one to a plurality of command signals in place of slave 40, and to transmit pseudo response signals q1 to master 10 via bus 20.

In this manner, by transmitting pseudo response signals q1 to master 10 during the reset process of slave 40, it is possible to cause the system to quickly return to the normal state by the reset process of slave 40 only, without stopping the next processing tasks of master 10. As a result, it is possible to properly handle the state in which an anomaly has occurred in slave 40.

[Advantageous Effects, Etc]

A method of controlling data processing system 1 according to the present embodiment is a method of controlling a data processing system including master 10, slave 40, and bus 20 provided on a path connecting master 10 and slave 40. The method of controlling the data processing system includes: performing normal processing which includes transmitting a plurality of command signals from master 10 to slave 40 via bus 20 and transmitting a plurality of response signals for the plurality of command signals from slave 40 to master 10 via bus 20; and performing anomaly avoidance processing to avoid an anomalous state when slave 40 is anomalous. In the method of controlling the data processing system, the performing of the anomaly avoidance processing includes: resetting slave 40; and performing a first pseudo response which includes disconnecting communication between bus 20 and slave 40, generating first pseudo response signals q1 corresponding one to one to the plurality of command signals in place of slave 40, and transmitting first pseudo response signals q1 to master 10 via bus 20.

In this manner, it is possible to transmit first pseudo response signals q1 to master 10 during the reset process of slave 40, and thus it is possible to cause the system to quickly return to the normal state by the reset process of slave 40 only, without stopping the next processing tasks of master 10. As a result, it is possible to properly handle the state in which an anomaly has occurred in slave 40.

In addition, first pseudo response signals q1 may be same in signal format as the plurality of response signals transmitted from slave 40 to master 10 via bus 20 in the performing of the normal processing.

According to this configuration, it is possible to transmit a signal that can be processed by master 10, and thus it is possible to cause the system to quickly return to the normal state without stopping the next processing tasks of master 10. As a result, it is possible to properly handle the state in which an anomaly has occurred in slave 40.

In addition, the performing of the first pseudo response may include: generating first pseudo response signal q1*a* corresponding to a command signal which has been transmitted to slave 40 among the plurality of command signals; and generating first pseudo response signal q1*b* corresponding to a command signal which has not been transmitted to slave 40 among the plurality of command signals.

In this manner, for example, it is possible to preserve the order of signals to be responded to master 10, and thus it is possible to cause the system to return to the normal state without stopping the next processing of master 10. As a result, it is possible to properly handle the state in which an anomaly has occurred in slave 40.

In addition, the performing of the anomaly avoidance processing may end after: the resetting of slave 40 has ended; all of first pseudo response signals q1 for the plurality of command signals have been transmitted in the performing of the first pseudo response; and all of processing tasks related to processing details that master 10 was processing when slave 40 became anomalous have been completed.

In this manner, it is possible to reliably end the anomaly avoidance step, and cause the system to return to the normal state. As a result, it is possible to properly handle the state in which an anomaly has occurred in slave 40.

In addition, data processing system 1 may further include another slave 40 that is connected to master 10 via bus 20 and is different from slave 40, and when the performing of the anomaly avoidance processing of slave 40 is being executed: master 10 may transmit another command signal different from the plurality of command signals to the other slave 40 via bus 20; and the other slave 40 may transmit a response signal for the other command signal to master 10 via bus 20.

In this manner, it is possible to perform the reset process only on slave 40 in which an anomaly has occurred, and thus it is possible to cause the system to quickly return to the normal state. As a result, it is possible to properly handle the state in which an anomaly has occurred in slave 40.

In addition, data processing system 1 may include a plurality of slaves 40 each being slave 40, and the performing of the anomaly avoidance processing may be executed for only slave 40 in which an anomaly has occurred among the plurality of slaves 40.

In this manner, it is possible to perform the reset process only on slave 40 in which an anomaly has occurred, and thus it is possible to cause the system to quickly return to the normal state. As a result, it is possible to properly handle the state in which an anomaly has occurred in slave 40.

Data processing system 1 according to the present embodiment includes a data processing system including: master 10; slave 40; bus 20 provided on a path connecting master 10 and slave 40; and first transfer cancellation section 30 provided on a path connecting bus 20 and slave 40. In the data processing system, master 10 transmits a plurality of command signals to slave 40 via bus 20 and first transfer cancellation section 30, slave 40 transmits a plurality of response signals for the plurality of command signals to master 10 via first transfer cancellation section 30 and bus 20, and when slave 40 is anomalous: slave 40 performs a reset process; and first transfer cancellation section 30 disconnects communication with slave 40, generates first pseudo response signals q1 corresponding one to one to the plurality of command signals in place of slave 40, and transmits the first pseudo response signals to master 10 via bus 20.

In this manner, it is possible to transmit first pseudo response signals q1 to master 10 during the reset process of slave 40, and thus it is possible to cause the system to quickly return to the normal state by the reset process of slave 40 only, without stopping the next processing tasks of master 10. As a result, it is possible to properly handle the state in which an anomaly has occurred in slave 40.

In addition, first transfer cancellation section 30 may: generate first pseudo response signal q1*a* corresponding to a command signal which has been transmitted to slave 40 among the plurality of command signals; and generate first pseudo response signal q1*b* corresponding to a command signal which has not been transmitted to slave 40 among the plurality of command signals.

In this manner, for example, it is possible to preserve the order of signals to be responded to master 10, and thus it is possible to cause the system to quickly return to the normal state without stopping the next processing of master 10. As a result, it is possible to properly handle the state in which an anomaly has occurred in slave 40.

In addition, after all of processing tasks related to processing details that master 10 was processing when slave 40 became anomalous have been completed, master 10 may output a processing completion signal indicating that the processing tasks have been completed to first transfer cancellation section 30 via bus 20.

In this manner, it is possible to reliably notify first transfer cancellation section 30 of the completion of the processing tasks of master 10. Accordingly, it is possible to reliably end the anomaly avoidance step, and cause the system to return to the normal state. As a result, it is possible to properly handle the state in which an anomaly has occurred in slave 40.

In addition, a dedicated signal line for notifying that all of processing tasks related to processing details that master 10 was processing when slave 40 became anomalous have been completed may be provided between master 10 and first transfer cancellation section 30.

In this manner, it is possible to reliably notify first transfer cancellation section 30 of the completion of the processing tasks of master 10. Accordingly, it is possible to reliably end the anomaly avoidance step, and cause the system to return to the normal state. As a result, it is possible to properly handle the state in which an anomaly has occurred in slave 40.

Embodiment 2

[Schematic Configuration of Data Processing System]

A schematic configuration of data processing system 1A according to Embodiment 2 will be described with reference to FIG. 7 and FIG. 8. In Embodiment 2, an example in which a transfer cancellation section is further provided on the path connecting between master 10 and bus 20 in addition to the configuration of Embodiment 1 will be described.

In Embodiment 2, transfer cancellation section 30 illustrated in Embodiment 1 is referred to as first transfer cancellation section 30, and pseudo response signal q1 illustrated in Embodiment 1 is referred to as first pseudo response signal q1.

Figure 7:
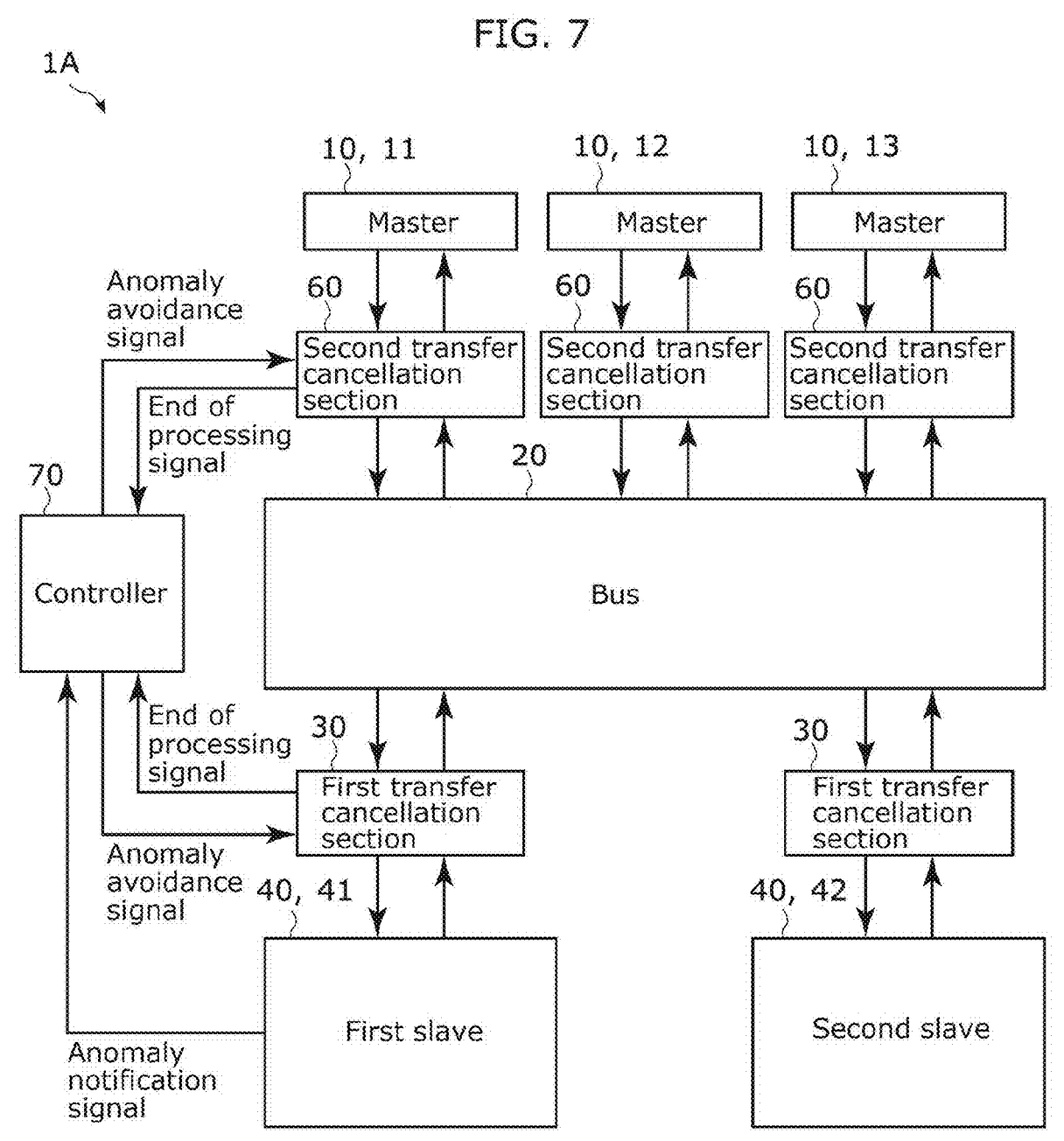

FIG. 7 is a block configuration diagram of data processing system 1A according to Embodiment 2. FIG. 8 is a diagram schematically illustrating an operation of data processing system 1A. In (a) of FIG. 8, the operation of data processing system 1A during a normal operation is illustrated, and in (b) of FIG. 8, the operation of data processing system 1A during an anomaly avoidance operation is illustrated.

As illustrated in FIG. 7, data processing system 1A includes a plurality of masters 10, a plurality of slaves 40, bus 20, a plurality of first transfer cancellation sections 30, a plurality of second transfer cancellation sections 60 provided on the path connecting the plurality of masters 10 and bus 20.

Figure 8:
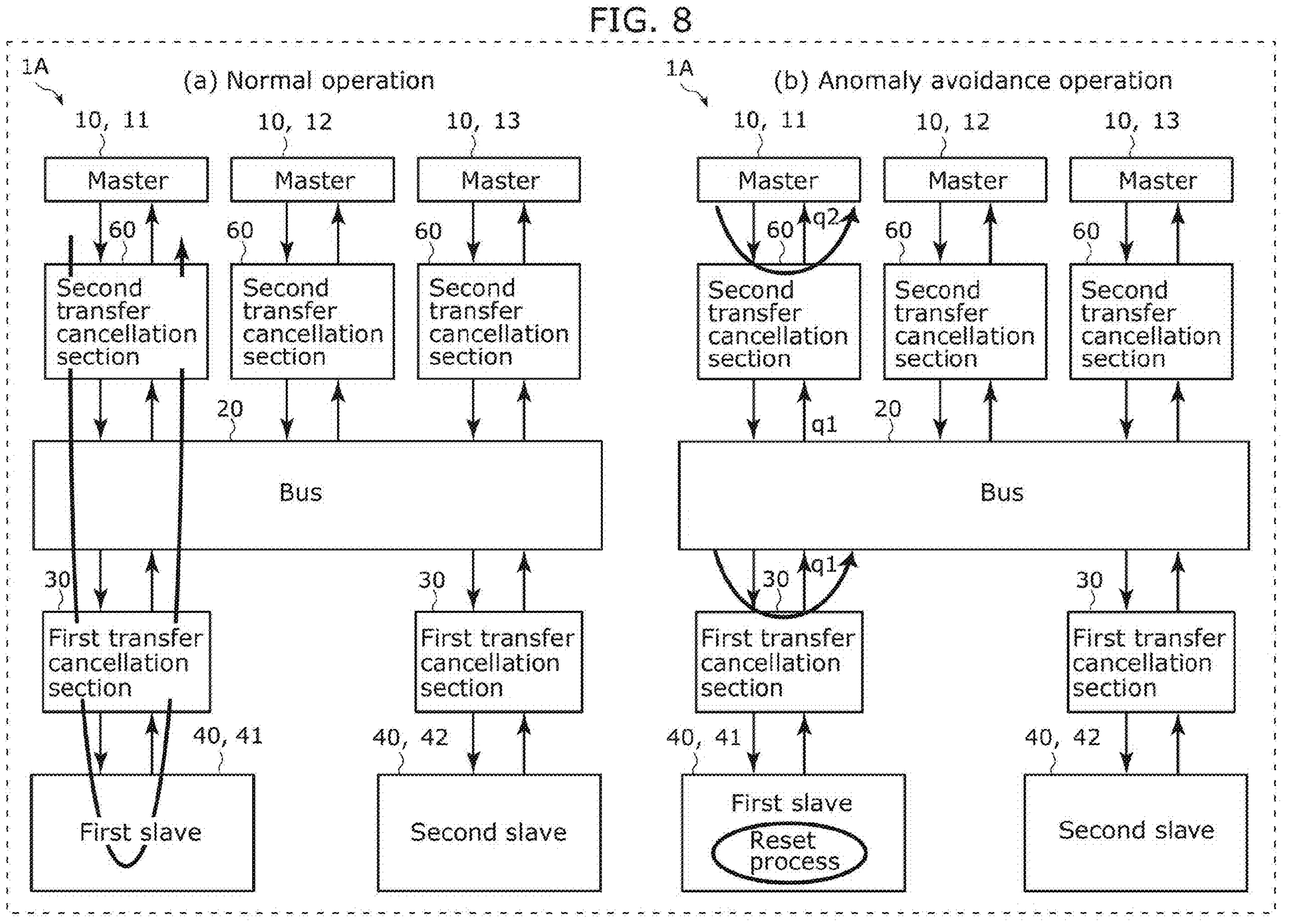
FIG. 8 is a diagram schematically illustrating an operation of the data processing system according to Embodiment 2.

As illustrated in (a) of FIG. 8, when data processing system 1A is normal, master 10 transmits a plurality of command signals and data signals to slave 40 via second transfer cancellation section 60, bus 20, and first transfer cancellation section 30. In addition, slave 40 transmits a plurality of response signals for the plurality of command signals to master 10 via first transfer cancellation section 30, bus 20, and second transfer cancellation section 60.

As illustrated in (b) of FIG. 8, when first slave 41 among the plurality of slaves 40 becomes anomalous, data processing system 1A performs an anomaly avoidance operation. For example, first slave 41 performs a reset process, and first transfer cancellation section 30 disconnects the communication with first slave 41. First transfer cancellation section 30 then generates first pseudo response signal q1 and transmits first pseudo response signal q1 to second transfer cancellation section 60 via bus 20. In addition, second transfer cancellation section 60 generates (i) second pseudo response signal q2 corresponding to first pseudo response signal q1 and (ii) second pseudo response signal q2 corresponding to a command signal transmitted from master 10 after the communication with first slave 41 has been disconnected, and transmits these second pseudo response signals q2 to master 10.

Second pseudo response signal q2 is a dummy signal transmitted to master 10 during the reset process of first slave 41. According to Embodiment 2, second transfer cancellation section 60 generates second pseudo response signal q2 and transmits second pseudo response signal q2 to master 10. It should be noted that at least a portion of second pseudo response signal q2 is generated based on first pseudo response signal q1. Second pseudo response signal q2 may be the same signal as first pseudo response signal q1, or may be a signal resulting from changing first pseudo response signal q1. In addition, second pseudo response signal q2 may include a signal generated without using first pseudo response signal q1.

As described above, by transmitting second pseudo response signal q2 to master 10 during the reset process of first slave 41, it is possible to cause the system to return to the normal state without stopping the next processing tasks of master 10. In other words, in data processing system 1A according to Embodiment 2, it is possible to cause the system to quickly return to the normal state, by resetting only first slave 41 while inhibiting quality degradation caused by the reset process of first slave 41. In this manner, it is possible to properly handle the state in which an anomaly occurs in first slave 41.

[Detailed Configuration of Data Processing System]

The detailed configuration of data processing system 1A will be described with reference to FIG. 7 to FIG. 10.

Data processing system 1A, for example, is configured by a large-scale integration (LSI).

As illustrated in FIG. 7, data processing system 1A includes a plurality of masters 10, bus 20, a plurality of first transfer cancellation sections 30, a plurality of slaves 40, and a plurality of second transfer cancellation sections 60. In addition, data processing system 1A includes controller 70. Masters 10 and slaves 40 are connected via second transfer cancellation sections 60, bus 20, and first transfer cancellation sections 30.

Masters 10, slaves 40, bus 20, and first transfer cancellation sections 30 are substantially equivalent to those in Embodiment 1.

Second transfer cancellation sections 60 are located on the path connecting masters 10 and bus 20. Second transfer cancellation section 60 may include, for example, a microprocessor, a DSP, a DMA controller, or the like, or may be controlled externally by them. In addition, a sequence for anomaly avoidance may be installed in advance. The functions of the each of the blocks in second transfer cancellation section 60, i.e., transfer cancellation controller 61, bus disconnection section 62, data generation section 63, and data absorption section 64, are implemented by control from outside or control within second transfer cancellation section 60 (see FIG. 9).

In a normal state in which no anomaly has occurred, second transfer cancellation section 60 transfers a plurality of command signals and a plurality of data signals transmitted from master 10, to slave 40 via bus 20 and first transfer cancellation section 30 as they are, and transfers the data signals transmitted back from slave 40 to master 10 via first transfer cancellation section 30 and bus 20 as they are.

Figure 9:
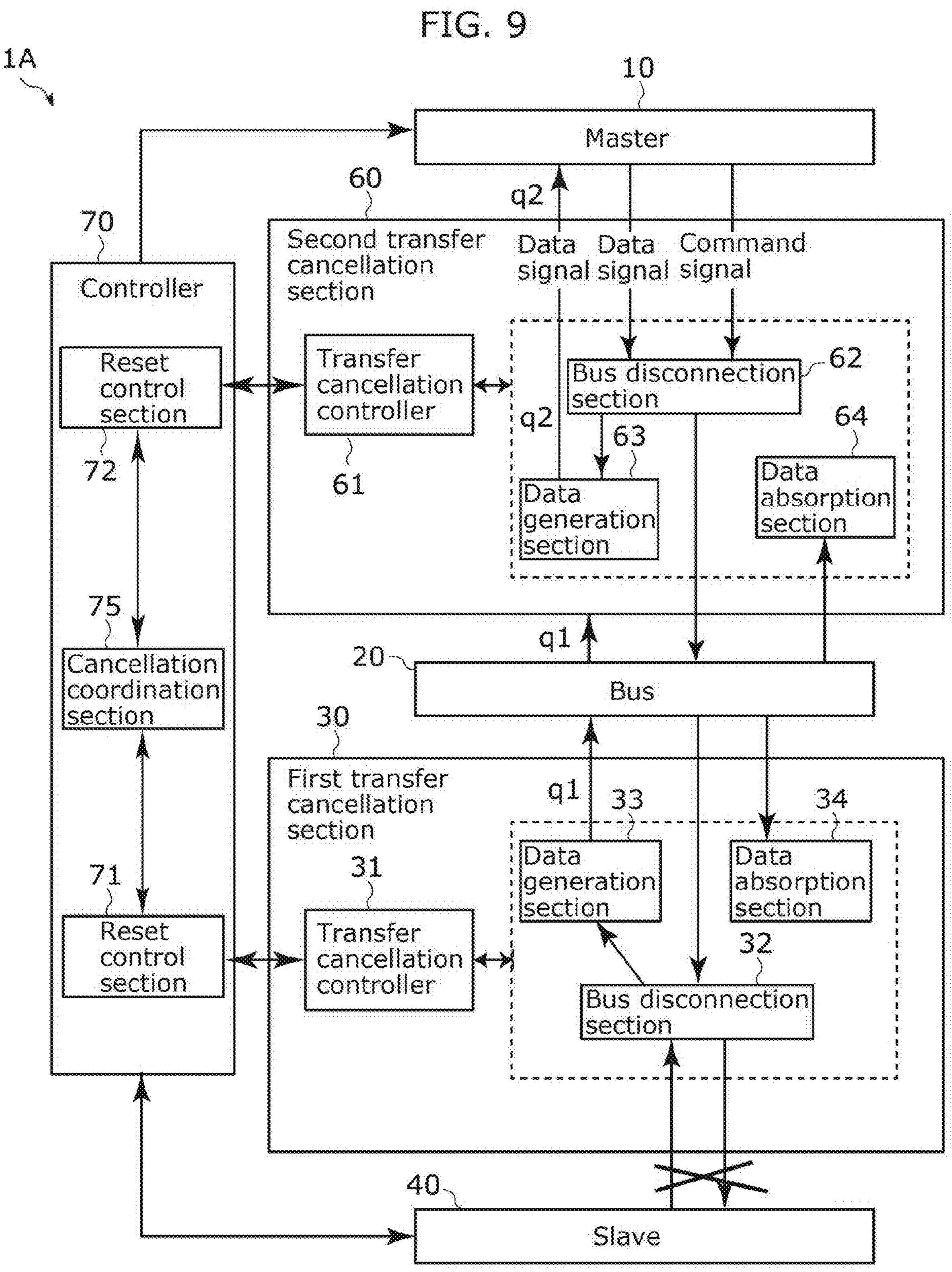
FIG. 9 is a diagram illustrating an anomaly avoidance operation of the data processing system according to Embodiment 2.

FIG. 9 is a diagram illustrating an anomaly avoidance operation of data processing system 1A. It should be noted that, in FIG. 9, the direction of signal output from each block is indicated by arrows.

Controller 70 controls the anomaly avoidance operation of data processing system 1A. Controller 70 according to Embodiment 2 includes reset control sections 71 and 72, and cancellation coordination section 75. Reset control section 71 is wire-connected to each of slave 40 and first transfer cancellation section 30. Reset control section 72 is wire-connected to each of second transfer cancellation section 60 and master 10. Cancellation coordination section 75 is communicatively connected to each of reset control sections 71 and 72, and coordinates the operations of reset control sections 71 and 72.

For example, when an anomaly has occurred in slave 40, slave 40 transmits an anomaly notification signal to controller 70, and then resets slave 40 itself. Upon receiving the anomaly notification signal transmitted from slave 40, controller 70 transmits an anomaly avoidance signal indicating the start of an anomaly avoidance operation to first transfer cancellation section 30 and second transfer cancellation section 60. First transfer cancellation section 30 and second transfer cancellation section 60 that have received the anomaly avoidance signal perform a predetermined anomaly avoidance operation.

First transfer cancellation section 30 includes transfer cancellation controller 31, bus disconnection section 32, data generation section 33, and data absorption section 34.

Transfer cancellation controller 31 controls the start of the operations of bus disconnection section 32, data generation section 33, and data absorption section 34, based on the control signal output from reset control section 71. In addition, transfer cancellation controller 31 notifies reset control section 71 of the operation statuses of bus disconnection section 32, data generation section 33, and data absorption section 34, as well as the end of the operation of first transfer cancellation section 30. Data absorption section 34 absorbs the data signal output from master 10 during the anomaly avoidance operation. Bus disconnection section 32 disconnects the communication with slave 40 during the anomaly avoidance operation.

Data generation section 33 generates first pseudo response signal q1 to be transmitted to second transfer cancellation section 60 during the anomaly avoidance operation. In other words, data generation section 33 according to Embodiment 2 generates a plurality of first pseudo response signals q1 corresponding one to one to a plurality of command signals received from master 10 via bus 20, and transmits the plurality of first pseudo response signals q1 to second transfer cancellation section 60 via bus 20.

As illustrated in FIG. 9, second transfer cancellation section 60 includes transfer cancellation controller 61, bus disconnection section 62, data generation section 63, and data absorption section 64.

Transfer cancellation controller 61 controls the start of the operations of bus disconnection section 62, data generation section 63, and data absorption section 64, based on the control signal output from reset control section 72. In addition, transfer cancellation controller 61 notifies reset control section 72 of the operation statuses of bus disconnection section 62, data generation section 63, and data absorption section 64, as well as the end of the operation of second transfer cancellation section 60.

Data absorption section 64 absorbs the data signal output from slave 40 during the anomaly avoidance operation. In other words, data absorption section 64 absorbs and discards the data signal in order to prevent the read data information output from slave 40 from reaching master 10.

Bus disconnection section 62 disconnects the outward communication with bus 20 during the anomaly avoidance operation. For example, bus disconnection section 62 stops transmitting to bus 20 one or more command signals transmitted from master 10 after the communication with bus 20 has been disconnected. On the other hand, bus disconnection section 62 does not disconnect the inward communication with bus 20 during the anomaly avoidance operation. It should be noted that the outward communication here is a communication path from second transfer cancellation section 60 toward bus 20, and the inward communication is a communication path from bus 20 toward second transfer cancellation section 60.

In addition, bus disconnection section 62 has a storage function (storage) that stores history information related to the transmission and reception of a command signal and a response signal. Bus disconnection section 62 is, using the history information, capable of determining whether the command signal transmitted from master 10 has been transmitted from bus disconnection section 62 to bus 20. In addition, bus disconnection section 62 is capable of determining whether or not first transfer cancellation section 30 and slave 40 have transmitted a response signal for the command signal transmitted to bus 20.

Data generation section 63 generates second pseudo response signals q2 to be transmitted to master 10 during the anomaly avoidance operation. Second pseudo response signals q2 are signals respectively corresponding to first pseudo response signal q1 and a command signal transmitted from master 10 after the communication between bus 20 and slave 40 has been disconnected. The signal format of second pseudo response signal q2 is the same as the signal format of the response signal transmitted from slave 40 to master 10 via bus 20 during the normal operation.

As described above, data generation section 63 generates second pseudo response signals q2 respectively corresponding to first pseudo response signal q1 and a command signal transmitted from master 10 after the communication between bus 20 and slave 40 has been disconnected, and transmits second pseudo response signals q2 to master 10.

FIG. 10 is a diagram illustrating in chronological order the anomaly avoidance operation of data processing system 1A.

As illustrated in FIG. 10, when an anomaly has occurred in slave 40, slave 40 transmits an anomaly notification signal to controller 70. Controller 70 outputs an anomaly avoidance signal to first transfer cancellation section 30 and second transfer cancellation section 60. First transfer cancellation section 30 and second transfer cancellation section 60 perform an anomaly avoidance operation based on a control signal from controller 70.

Second transfer cancellation section 60 generates second pseudo response signals q2 corresponding one to one to the plurality of command signals. Second pseudo response signals q2 are divided into two subsets, namely, a first subset including second pseudo response signal q2*a* and second subset including second pseudo response signal q2*b*, depending on whether a command signal has been transmitted from second transfer cancellation section 60 to bus 20. Second pseudo response signal q2*a* is a signal corresponding to a command signal that has been transmitted from second transfer cancellation section 60 to bus 20, and second pseudo response signal q2*b* is a signal corresponding to a command signal that has not been transmitted from second transfer cancellation section 60 to bus 20. The time when an anomaly of slave 40 is detected is the boundary that divides whether a command signal has been transmit to bus 20 or not.

More specifically, second transfer cancellation section 60 causes data generation section 63 to generate, as second pseudo response signal q2*a*, a signal corresponding to the command signal which has been transmitted to bus 20, but for which no response signal has been transmitted to master 10. Data generation section 63 generates second pseudo response signal q2*a* and transmits second pseudo response signal q2*a* to master 10 via bus disconnection section 62. In addition, second transfer cancellation section 60 causes data generation section 63 to generate, as second pseudo response signal q2*b*, a signal corresponding to the command signal which has not been transmitted to bus 20. Data generation section 63 generates second pseudo response signal q2*b* and transmits second pseudo response signal q2*b* to master 10 via bus disconnection section 62. The timing of transmission to master 10 is always later for second pseudo response signal q2*b* than for second pseudo response signal q2*a*. It should be noted that second pseudo response signal q2*a* and second pseudo response signal q2*b* are same in signal format.

After ending the generation of all first pseudo response signals q1 corresponding to the command signals that have been input and transmitting the all first pseudo response signals q1 to second transfer cancellation section 60, first transfer cancellation section 30 notifies controller 70 of an end of processing signal for first pseudo response signals q1.

After: ending the generation of all second pseudo response signals q2 corresponding to first pseudo response signals q1 that have been input and the command signals that have been input from master 10 after the communication between bus 20 and slave 40 has been disconnected; and transmitting the all second pseudo response signals q2 to master 10, second transfer cancellation section 60 notifies controller 70 of an end of processing signal for second pseudo response signals q2.

The anomaly avoidance operation of data processing system 1A ends after: the reset process of slave 40 has ended; and first transfer cancellation section 30 has transmitted all first pseudo response signals q1. When these conditions are met, data processing system 1A returns to the normal state, and master 10 performs the next processing tasks (N+1).

In data processing system 1A described above, when slave 40 is anomalous, slave 40 performs the reset process. First transfer cancellation section 30 disconnects the communication with slave 40, generates first pseudo response signals q1 corresponding one to one to a plurality of command signals in place of slave 40, and transmits first pseudo response signals q1 to second transfer cancellation section 60 via bus 20. Second transfer cancellation section 60 generates second pseudo response signals q2 respectively corresponding to first pseudo response signal q1 and a command signal transmitted from master 10 after the communication with slave 40 has been disconnected, and transmits second pseudo response signals q2 to master 10.

In this manner, by transmitting second pseudo response signal q2 to master 10 during the reset process of slave 40, it is possible to cause the system to quickly return to the normal state by the reset process of slave 40 only, without stopping the next processing tasks of master 10. As a result, it is possible to properly handle the state in which an anomaly has occurred in slave 40. In addition, it is possible to simply implement the configuration for handling the state in which an anomaly has occurred in slave 40 without having to change the design or modify the functions of slave 40.

Furthermore, it is necessary to continue to disconnect the communication between bus 20 and slave 40 until the processing tasks (N) of master 10 are completed according to Embodiment 1. However, when second transfer cancellation section 60 is provided in addition to first transfer cancellation section 30 as in Embodiment 2, it is possible to cancel the disconnection of the communication between bus 20 and slave 40 when first transfer cancellation section 30 has ended the transmission of first pseudo response signal q1. As a result, it is possible to effectively utilize slave 40.

Figure 11:
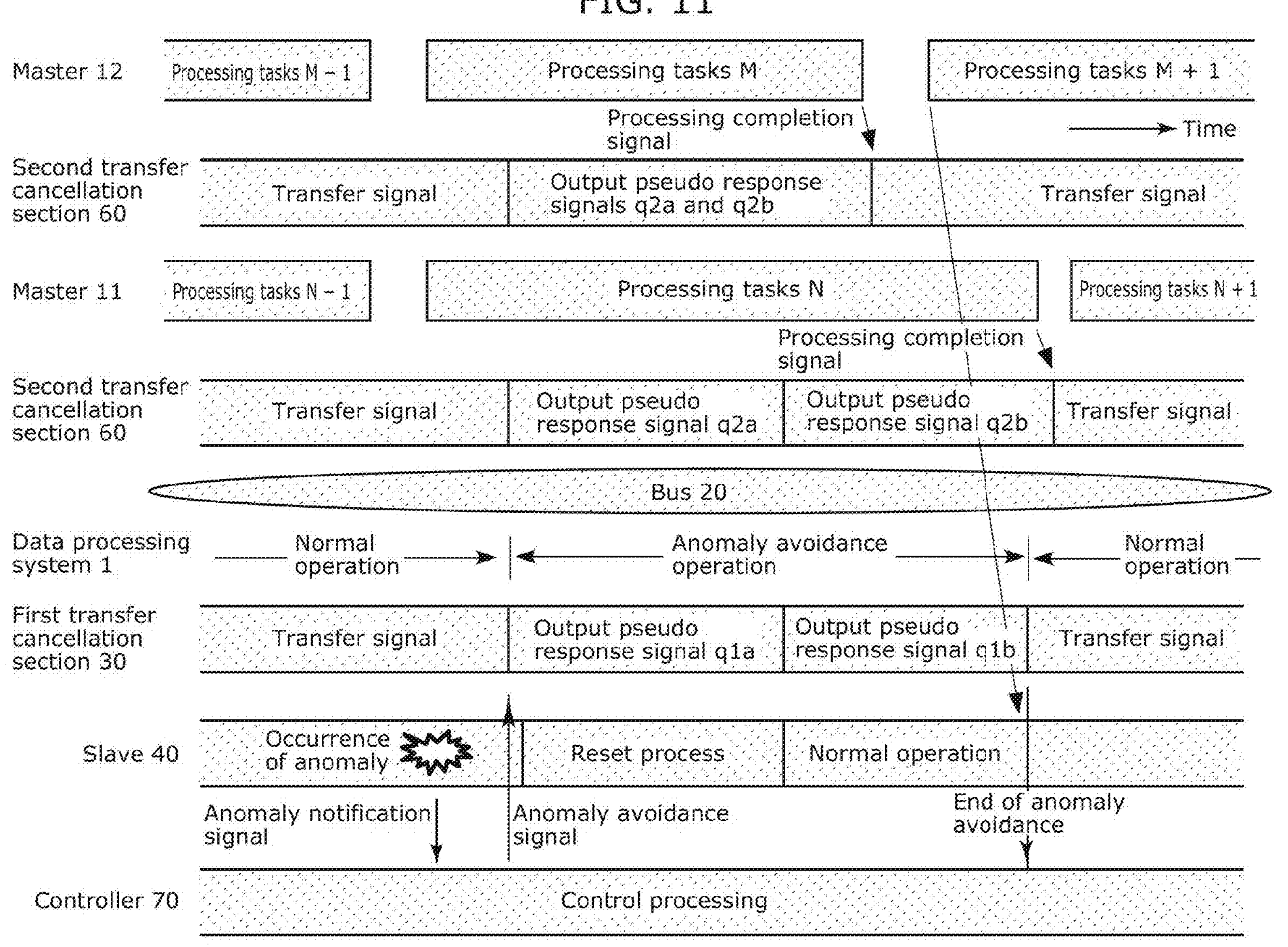
FIG. 11 is a diagram illustrating in chronological order another example of the anomaly avoidance operation of the data processing system according to Embodiment 2.

FIG. 11 is a diagram illustrating in chronological order another example of the anomaly avoidance operation of data processing system 1A according to Embodiment 2.

In FIG. 11, the processing tasks (M) of master 12 are illustrated in addition to master 11 that has been described above as master 10. In the example illustrated in the diagram, it is possible to cancel the disconnection between bus 20 and slave 40 when the transmission of first pseudo response signals q1 of first transfer cancellation section 30 ends, and thus processing tasks (M+1) of master 12 can be accepted even when processing tasks (N) of master 11 have not been completed. As a result, in data processing system 1A, it is possible to reduce the vacant time of slave 40 and effectively utilize slave 40.

[Method of Controlling Data Processing System]

A method of controlling data processing system 1A according to Embodiment 2 will be described with reference to FIG. 12 and FIG. 13.

Figure 12:
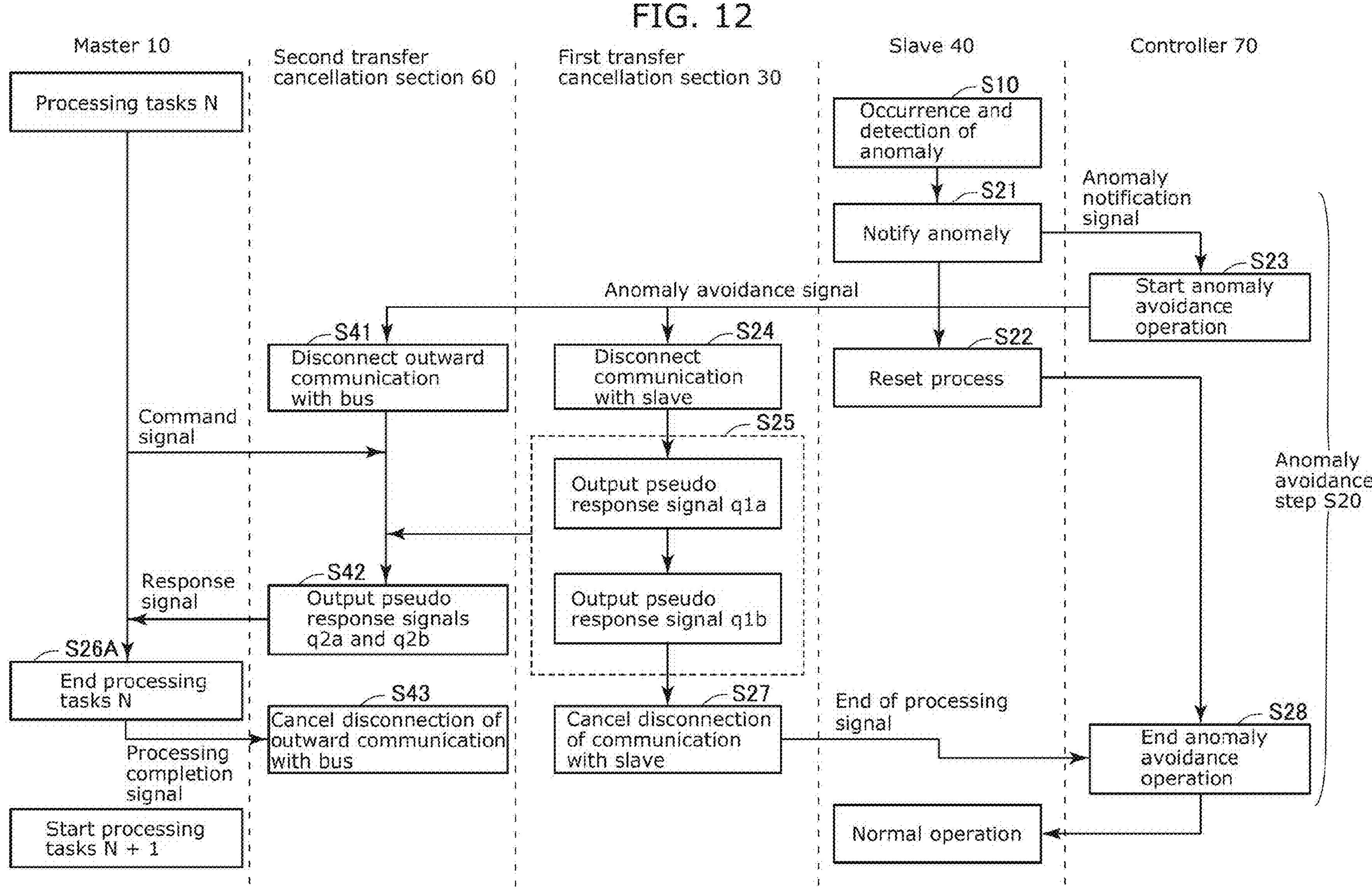
FIG. 12 is a diagram illustrating a method of controlling the data processing system according to Embodiment 2.

FIG. 12 is a diagram illustrating a method of controlling data processing system 1A according to Embodiment 2.

In data processing system 1A in the normal state (normal step), a plurality of command signals are transmitted from master 10 to slave 40 via bus 20. In addition, a plurality of response signals for the plurality of command signals are transmitted from slave 40 to master 10 via bus 20.

When an anomaly has occurred in slave 40 and the anomaly is detected (step S10), anomaly avoidance step S20 is performed in data processing system 1A.

Slave 40 in which an anomaly has occurred transmits an anomaly notification signal to controller 70 (step S21). In addition, slave 40 starts a reset process of slave 40 itself (reset step S22).

After receiving the anomaly notification signal, controller 70 outputs an anomaly avoidance signal to first transfer cancellation section 30 and second transfer cancellation section 60 (step S23). First transfer cancellation section 30 and second transfer cancellation section 60 perform an anomaly avoidance operation based on a control signal from controller 70.

More specifically, first transfer cancellation section 30 disconnects the communication with slave 40 (step S24). Then, first transfer cancellation section 30 generates first pseudo response signals q1 corresponding one to one to a plurality of command signals in place of slave 40, and transmits first pseudo response signals q1 to second transfer cancellation section 60 via bus 20 (first pseudo response step S25).

In addition, second transfer cancellation section 60 disconnects the outward communication with bus 20 (step S41). Then, second transfer cancellation section 60 generates (i) second pseudo response signal q2 corresponding to first pseudo response signal q1 and (ii) second pseudo response signal q2 corresponding to a command signal transmitted from master 10 after the communication with first slave 40 has been disconnected, and transmits these second pseudo response signals q2 to master 10 (second pseudo response step S42).

In second pseudo response step S42, among a plurality of command signals, second pseudo response signal q2*a* which is a signal corresponding to the command signal which has been transmitted to bus 20, but for which no response signal has been transmitted to master 10. In addition, in second pseudo response step S42, pseudo response signal q2*b* is generated. Pseudo response signal q2*b* is a signal corresponding to the command signal that has not been transmitted to slave 20 among the plurality of command signals. Pseudo response signal q2*a* and pseudo response signal q2*b* are transmitted to master 10 in the same order as the command signals issued by master 10.

FIG. 13 is a diagram illustrating a signal that passes between the blocks of data processing system 1A.

In FIG. 13, the sequential order of the command signals issued by master 10 is indicated by the numerical sequence. As illustrated in this diagram, there is a time lag in the signals that pass between the blocks. In this diagram, signals generated during the normal operation are indicated by circled numbers, first pseudo response signals q1 generated during the anomaly avoidance operation are indicated by bold circled numbers and dashed circled numbers, and second pseudo response signals q2 are indicated by bold boxed numbers and dashed boxed numbers.

It is illustrated in this example that the command signals numbered 1 through 15 have been issued in processing tasks (N) of master 10 and that an anomaly has been detected between the issuance of the command signal numbered 12 and the issuance of the command signal numbered 13.

The command signals numbered 1 through 12 are signals issued during the normal operation. The command signals numbered 1 through 10 of them are transferred as they are from first transfer cancellation section 30 to slave 40, and are input to slave 40. Slave 40 generates response signals corresponding to the command signals numbered 1 through 7 received before the detection of the anomaly, and transmits the response signals to first transfer cancellation section 30. On the other hand, for the command signals numbered 8 through 12 received after the detection of the anomaly, response signals are not generated by slave 40 or the command signals do not reach slave 40 because a reset process is performed in slave 40. Accordingly, first transfer cancellation section 30 generates pseudo response signals q1 for the command signals numbered 8 through 12. More specifically, pseudo response signal q1*a* is generated for each of the command signals numbered 8 through 10 which have been transmitted from first transfer cancellation section 30 to slave 40, but for which no response signal has been transmitted from slave 40. In addition, first pseudo response signal q1*b* is generated for each of the command signals numbered 11 through 12 which have not been transmitted from first transfer cancellation section 30 to slave 40. First pseudo response signals q1 generated in first transfer cancellation section 30 are transmitted to second transfer cancellation section 60.

Second transfer cancellation section 60 generates second pseudo response signals q2 based on first pseudo response signals q1 numbered 8 through 12 transmitted from first transfer cancellation section 30. In addition, second transfer cancellation section 60 also generates second pseudo response signals q2 for the response signals numbered 4 through 7 which are response signals after the detection of the anomaly among the response signals from slave 40. In addition, the command signals numbered 13 through 15 which are command signals after the detection of the anomaly by master 10 do not reach bus 20 because the outward communication to bus 20 has been disconnected, and thus second transfer cancellation section 60 generates second pseudo response signals q2 for the command signals numbered 13 through 15. It should be noted that, in this example, those numbered 8 through 12 are second pseudo response signals q2*a* generated based on first pseudo response signals q1. In this case, second pseudo response signal q2 may be the same signal as first pseudo response signal q1, or may be a signal resulting from changing first pseudo response signal q1. In addition, in this example, those numbered 4 through 7 are second pseudo response signals q2*a* generated without using first pseudo response signals q1, and those numbered 13 through 15 are pseudo response signals q2*b* generated without using first pseudo response signals q1.

The normal response signals numbered 1 through 3 generated by slave 40 and second pseudo response signals q2 numbered 4 through 15 generated by second transfer cancellation section 60 are transmitted to master 10.

As illustrated in FIG. 12, master 10 outputs a processing completion signal indicating that processing tasks N related to the processing details that master 10 was processing when slave 40 became anomalous have all been completed, to second transfer cancellation section 60 (step S26A). In this manner, second transfer cancellation section 60 cancels the disconnection of the outward communication with bus 20 (step S43).

In addition, as illustrated in FIG. 12, after the reset process of slave 40 has ended, and after first pseudo response signals q1 have all been transmitted in first pseudo response step S25, first transfer cancellation section 30 cancels the disconnection of the communication with slave 40 (step S27), and ends first pseudo response step S25. First transfer cancellation section 30 notifies controller 70 of the end of processing signal. When receiving the end of processing signal, controller 70 ends the anomaly avoidance operation (step S28) and ends anomaly avoidance step S20. When these conditions are met, data processing system 1A returns to the normal state, and master 10 performs the next processing tasks (N+1).

The control method of data processing system 1A according to Embodiment 2 includes anomaly avoidance step S20 to avoid an anomalous state when slave 40 is anomalous. Anomaly avoidance step S20 includes reset step S22 to reset slave 40, first pseudo response step S25 to disconnect the communication between bus 20 and slave 40, generate first pseudo response signals q1 corresponding one to one to a plurality of command signals in place of slave 40, and transmit first pseudo response signals q1 toward master 10 via bus 20, and second pseudo response step S42 to generate second pseudo response signals q2 respectively corresponding to first pseudo response signal q1 and the command signals transmitted from master 10 after the communication between bus 20 and slave 40 has been disconnected, and transmits second pseudo response signals q2 to master 10.

In this manner, by transmitting second pseudo response signal q2 to master 10 during the reset process of slave 40, it is possible to cause the system to quickly return to the normal state by the reset process of slave 40 only, without stopping the next processing tasks of master 10. As a result, it is possible to properly handle the state in which an anomaly has occurred in slave 40.

[Advantageous Effects, Etc]

A method of controlling data processing system 1A according to the present embodiment is a method of controlling a data processing system including master 10, slave 40, and bus 20 provided on a path connecting master 10, and slave 40. The method of controlling the data processing system includes: performing normal processing which includes transmitting a plurality of command signals from master 10 to slave 40 via bus 20 and transmitting a plurality of response signals for the plurality of command signals from slave 40 to master 10 via bus 20; and performing anomaly avoidance processing to avoid an anomalous state when slave 40 is anomalous. In the method of controlling the data processing system, the performing of the anomaly avoidance processing includes: resetting slave 40; performing a first pseudo response which includes disconnecting communication between bus 20 and slave 40, generating first pseudo response signals q1 corresponding one to one to the plurality of command signals in place of slave 40, and transmitting first pseudo response signals q1 toward master 10 via bus 20; and performing a second pseudo response which includes generating second pseudo response signals q2 corresponding to first pseudo response signals q1 and corresponding to the plurality of command signals transmitted from master 10 after the disconnecting of the communication between bus 20 and slave 40, and transmitting second pseudo response signals q2 to master 10.

In this manner, it is possible to transmit second pseudo response signals q2 to master 10 during the reset process of slave 40, and thus it is possible to cause the system to quickly return to the normal state by the reset process of slave 40 only, without stopping the next processing tasks of master 10. As a result, it is possible to properly handle the state in which an anomaly has occurred in slave 40.

In addition, second pseudo response signals q2 may be same in signal format as the plurality of response signals transmitted from slave 40 to master 10 via bus 20 in the performing of the normal processing.

According to this configuration, it is possible to transmit a signal that can be processed by master 10, and thus it is possible to cause the system to quickly return to the normal state without stopping the next processing tasks of master 10. As a result, it is possible to properly handle the state in which an anomaly has occurred in slave 40.

In addition, the performing of the second pseudo response may include: generating second pseudo response signal q2*a* corresponding to a command signal which has been transmitted to bus 20 but for which no response signal has been transmitted to master 10 among the plurality of command signals; and generating second pseudo response signal q2*b* corresponding to a command signal that has not been transmitted to bus 20 among the plurality of command signals.

In this manner, for example, it is possible to preserve the order of signals to be responded to master 10, and thus it is possible to cause the system to return to the normal state without stopping the next processing tasks of master 10. As a result, it is possible to properly handle the state in which an anomaly has occurred in slave 40.

In addition, at least a portion of each of second pseudo response signals q2 may be generated based on a corresponding one of first pseudo response signals q1.

In this manner, it is possible to simply and quickly generate second pseudo response signals q2. As a result, it is possible to properly handle the state in which an anomaly has occurred in slave 40.

In addition, second pseudo response signals q2 may include a signal generated without using first pseudo response signals q1.

In this manner, it is possible to generate second pseudo response signal q2 without being constrained by others. As a result, it is possible to properly handle the state in which an anomaly has occurred in slave 40.

In addition, the performing of the anomaly avoidance processing may end as a result of an end of the resetting of slave 40 and an end of the performing of the first pseudo response.

In this manner, it is possible to reliably and quickly end the anomaly avoidance step, and cause the system to return to the normal state. As a result, it is possible to properly handle the state in which an anomaly has occurred in slave 40.

Data processing system 1A according to the present embodiment includes master 10; slave 40; bus 20 provided on a path connecting master 10 and slave 40; first transfer cancellation section 30 provided on a path connecting bus 20 and slave 40; and second transfer cancellation section 60 provided on a path connecting master 10 and bus 20. In data processing system 1A, master 10 transmits a plurality of command signals to slave 40 via second transfer cancellation section 60, bus 20, and first transfer cancellation section 30. Slave 40 transmits a plurality of response signals for the plurality of command signals to master 10 via first transfer cancellation section 30, bus 20, and second transfer cancellation section 60. When slave 40 is anomalous: slave 40 performs a reset process. First transfer cancellation section 30 disconnects communication with slave 40, generates first pseudo response signals corresponding one to one to the plurality of command signals in place of slave 40, and transmits the first pseudo response signals to second transfer cancellation section 60 via bus 20. Second transfer cancellation section 60 generates second pseudo response signals corresponding to the first pseudo response signals and corresponding to the plurality of command signals transmitted from master 10 after the communication with slave 40 has been disconnected, and transmits the second pseudo response signals to master 10.

In this manner, it is possible to transmit second pseudo response signals q2 to master 10 during the reset process of slave 40, and thus it is possible to cause the system to quickly return to the normal state by the reset process of slave 40 only, without stopping the next processing tasks of master 10. As a result, it is possible to properly handle the state in which an anomaly has occurred in slave 40.

In addition, second transfer cancellation section 60: may generate second pseudo response signal q2*a* corresponding to a command signal which has been transmitted to bus 20 but for which no response signal has been transmitted to master 10 among the plurality of command signals; and may generate second pseudo response signal q2*a* corresponding to a command signal that has not been transmitted to bus 20 among the plurality of command signals.

In this manner, for example, it is possible to preserve the order of signals to be responded to master 10, and thus it is possible to cause the system to return to the normal state without stopping the next processing tasks of master 10. As a result, it is possible to properly handle the state in which an anomaly has occurred in slave 40.

Other Embodiments

Although the data processing system, etc. according to the present disclosure have been described above based on the embodiments, etc., the present disclosure is not limited to the above-described embodiments. For example, another embodiment which is realized by arbitrarily combining the structural components described in this specification, or excluding one or more of the structural components may be an embodiment of the present disclosure. In addition, the present disclosure also covers variations obtained by applying a variety of modifications conceived by persons skilled in the art to the above-mentioned embodiments, without departing from the gist of the present disclosure, namely, the scope of claims.

In addition, forms indicated below may also be included within the scope of one or more aspects of the present disclosure.

(1) One or more of the structural components included in the above-described data processing system may be computer systems including a microprocessor, read-only memory (ROM), random access memory (RAM), etc. A computer program is stored in the RAM. The microprocessor operates according to the computer program, thereby achieving the functions. Here, the computer program is configured by combining a plurality of instruction codes each indicating an instruction for the computer so that a predetermined function is achieved.

(2) One or more of the structural components included in the above-described data processing system may be configured from a single System LSI (Large Scale Integration). The System LSI is a super-multi-function LSI manufactured by integrating constituent units on one chip, and is specifically a computer system configured by including a microprocessor, a ROM, a RAM, and so on. A computer program is stored in the RAM. The System-LSI achieves its function through the microprocessor's operation according to the computer program.

INDUSTRIAL APPLICABILITY

The present disclosure can be applied to data processing systems in which data is processed by a master and a slave.

The invention claimed is:

1. A method of controlling a data processing system including a master, a slave, and a bus provided on a path connecting the master and the slave, the method of controlling the data processing system comprising:

performing normal processing which includes transmitting a plurality of command signals from the master to the slave via the bus and transmitting a plurality of response signals for the plurality of command signals from the slave to the master via the bus; and performing anomaly avoidance processing to avoid an anomalous state when the slave is anomalous, wherein the performing of the anomaly avoidance processing includes:

resetting the slave;

performing a first pseudo response which includes disconnecting communication between the bus and the slave, generating first pseudo response signals corresponding one to one to the plurality of command signals in place of the slave, and transmitting the first pseudo response signals toward the master via the bus; and performing a second pseudo response which includes generating second pseudo response signals corresponding to the first pseudo response signals and corresponding to the plurality of command signals transmitted from the master after the disconnecting of the communication between the bus and the slave, and transmitting the second pseudo response signals to the master, and the performing of the second pseudo response includes:

generating a first subset including each of the second pseudo response signals corresponding to a command signal which has been transmitted to the bus but for which no response signal has been transmitted to the master among the plurality of command signals; and generating a second subset including each of the second pseudo response signals corresponding to a command signal that has not been transmitted to the bus among the plurality of command signals.

2. The method of controlling the data processing system according to claim 1, wherein the second pseudo response signals are same in signal format as the plurality of response signals transmitted from the slave to the master via the bus in the performing of the normal processing.

3. The method of controlling the data processing system according to claim 1, wherein at least a portion of each of the second pseudo response signals is generated based on a corresponding one of the first pseudo response signals.

4. The method of controlling the data processing system according to claim 1, wherein the second pseudo response signals include a signal generated without using the first pseudo response signals.

5. The method of controlling the data processing system according to claim 1, wherein the performing of the anomaly avoidance processing ends as a result of an end of the resetting of the slave and an end of the performing of the first pseudo response.

6. A data processing system comprising: a master; a slave; a bus provided on a path connecting the master and the slave; a first transfer cancellation section provided on a path connecting the bus and the slave; and a second transfer cancellation section provided on a path connecting the master and the bus, wherein the master transmits a plurality of command signals to the slave via the second transfer cancellation section, the bus, and the first transfer cancellation section, the slave transmits a plurality of response signals for the plurality of command signals to the master via the first transfer cancellation section, the bus, and the second transfer cancellation section, and when the slave is anomalous:

the slave performs a reset process;

the first transfer cancellation section disconnects communication with the slave, generates first pseudo response signals corresponding one to one to the plurality of command signals in place of the slave, and transmits the first pseudo response signals to the second transfer cancellation section via the bus; and the second transfer cancellation section generates second pseudo response signals corresponding to the first pseudo response signals and corresponding to the plurality of command signals transmitted from the master after the communication with the slave has been disconnected, and transmits the second pseudo response signals to the master.

7. The data processing system according to claim 6, wherein the second transfer cancellation section:

generates a first subset including each of the second pseudo response signals corresponding to a command signal which has been transmitted to the bus but for which no response signal has been transmitted to the master among the plurality of command signals; and generates a second subset including each of the second pseudo response signals corresponding to a command signal that has not been transmitted to the bus among the plurality of command signals.

* * * * *